(12) United States Patent
Bradley et al.

(10) Patent No.: US 8,830,866 B2
(45) Date of Patent: Sep. 9, 2014

(54) METHODS AND APPARATUS FOR SOLICITED ACTIVATION FOR PROTECTED WIRELESS NETWORKING

(75) Inventors: Bob Bradley, Cupertino, CA (US); Mohammad Gharahgouzloo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 12/873,263

(22) Filed: Aug. 31, 2010

(65) Prior Publication Data

US 2011/0211219 A1    Sep. 1, 2011

Related U.S. Application Data

(63) Continuation-in-part of application No. 12/571,102, filed on Sep. 30, 2009.

(51) Int. Cl.
*G06F 3/12*    (2006.01)

(52) U.S. Cl.
CPC ........................ *G06F 3/12* (2013.01)
USPC ........................................... 370/254

(58) Field of Classification Search
CPC .... G06F 3/1225; G06F 3/1226; G06F 3/1204
See application file for complete search history.

(56) References Cited

U.S. PATENT DOCUMENTS

| | | | |
|---|---|---|---|
| 6,275,299 B1 * | 8/2001 | Beck | 358/1.15 |
| 6,434,113 B1 | 8/2002 | Gubbi | |
| 6,463,473 B1 | 10/2002 | Gubbi | |
| 6,928,295 B2 | 8/2005 | Olson et al. | |
| 6,934,752 B1 | 8/2005 | Gubbi | |
| 7,110,374 B2 | 9/2006 | Malhotra et al. | |
| 7,254,708 B2 | 8/2007 | Silvester | |
| 7,274,684 B2 | 9/2007 | Young et al. | |
| 7,466,678 B2 | 12/2008 | Cromer et al. | |
| 7,493,368 B2 | 2/2009 | Raverdy et al. | |
| 7,508,801 B1 | 3/2009 | Calhoun et al. | |
| 7,522,549 B2 | 4/2009 | Karaoguz et al. | |
| 7,577,125 B2 | 8/2009 | Abhishek et al. | |
| 7,603,557 B2 | 10/2009 | Zhang et al. | |
| 7,634,249 B2 | 12/2009 | Hahn et al. | |
| 7,706,345 B2 | 4/2010 | Meier et al. | |
| 7,715,793 B2 | 5/2010 | Fuccello et al. | |

(Continued)

FOREIGN PATENT DOCUMENTS

| | | |
|---|---|---|
| EP | 1950987 A1 | 7/2008 |
| EP | 1983778 A1 | 10/2008 |

(Continued)

OTHER PUBLICATIONS

Search/Examination Report dated Jan. 5, 2012 from GB Patent Application No. 1114925.9, 2 pages.

(Continued)

*Primary Examiner* — Jason Mattis
*Assistant Examiner* — Bao G Nguyen
(74) *Attorney, Agent, or Firm* — Park, Vaughan, Fleming & Dowler LLP

(57) ABSTRACT

Methods and apparatus that enable solicited access to a secure wireless network having complex security protocols. In one embodiment, such solicited access is performed using a streamlined or reduced number of user actions and includes an exemplary active/passive scanning protocol and use of an optimized service discovery protocol (SDP).

12 Claims, 23 Drawing Sheets

(56) References Cited

U.S. PATENT DOCUMENTS

| | | | |
|---|---|---|---|
| 7,911,990 | B2 | 3/2011 | Alam et al. |
| 7,916,663 | B2 | 3/2011 | Yee |
| 7,936,710 | B2 | 5/2011 | Rodriguez et al. |
| 2003/0065918 | A1 | 4/2003 | Willey |
| 2003/0196008 | A1* | 10/2003 | Kim ................................ 710/19 |
| 2004/0117500 | A1 | 6/2004 | Lindholm et al. |
| 2004/0264413 | A1 | 12/2004 | Kaidar et al. |
| 2005/0239445 | A1 | 10/2005 | Karaoguz et al. |
| 2005/0256180 | A1 | 11/2005 | Bergmanis et al. |
| 2006/0116107 | A1 | 6/2006 | Hulvey |
| 2006/0128415 | A1 | 6/2006 | Horikoshi et al. |
| 2006/0171388 | A1* | 8/2006 | Ikeda ............................ 370/389 |
| 2006/0200862 | A1 | 9/2006 | Olson et al. |
| 2006/0239208 | A1* | 10/2006 | Roberts et al. ................ 370/254 |
| 2007/0004404 | A1 | 1/2007 | Buckley et al. |
| 2007/0038787 | A1 | 2/2007 | Harris et al. |
| 2007/0055743 | A1 | 3/2007 | Pirtle et al. |
| 2007/0080823 | A1 | 4/2007 | Fu et al. |
| 2007/0141988 | A1* | 6/2007 | Kuehnel et al. .............. 455/41.2 |
| 2007/0153317 | A1* | 7/2007 | Klein ........................... 358/1.15 |
| 2007/0177192 | A1* | 8/2007 | Wang ........................... 358/1.15 |
| 2007/0206537 | A1 | 9/2007 | Cam-Winget et al. |
| 2007/0223670 | A1* | 9/2007 | Ido ........................... 379/201.01 |
| 2008/0014998 | A1 | 1/2008 | Choi |
| 2008/0046545 | A1 | 2/2008 | Koren et al. |
| 2008/0168129 | A1 | 7/2008 | Robbin et al. |
| 2008/0220719 | A1 | 9/2008 | Sakhpara |
| 2008/0227393 | A1 | 9/2008 | Tang et al. |
| 2008/0256205 | A1 | 10/2008 | Mahoney |
| 2008/0320190 | A1 | 12/2008 | Lydon et al. |
| 2009/0031035 | A1 | 1/2009 | Dharmaraju et al. |
| 2009/0052382 | A1 | 2/2009 | Stephenson et al. |
| 2009/0055510 | A1 | 2/2009 | Svendsen |
| 2009/0215388 | A1 | 8/2009 | Karaoguz et al. |
| 2009/0222116 | A1 | 9/2009 | Kang et al. |
| 2009/0271709 | A1 | 10/2009 | Jin et al. |
| 2010/0165402 | A1* | 7/2010 | Karaoguz et al. ............ 358/1.15 |
| 2010/0165879 | A1 | 7/2010 | Gupta et al. |
| 2010/0242054 | A1* | 9/2010 | Wu et al. ....................... 719/321 |
| 2011/0281557 | A1 | 11/2011 | Choi et al. |

FOREIGN PATENT DOCUMENTS

| | | | |
|---|---|---|---|
| EP | 2184892 | A1 | 5/2010 |
| EP | 2 387 260 | A2 | 11/2011 |
| WO | WO 2007/068164 | A1 | 6/2007 |
| WO | WO 2008/008987 | A2 | 1/2008 |

OTHER PUBLICATIONS

Bradley, "Methods and Apparatus for Solicited Activation for Protected Wireless Networking," U.S. Appl. No. 12/571,102, filed Sep. 30, 2009.

International Search Report of the International Searching Authority for Application No. PCT/US2010/049663, mailed on Feb. 24, 2011, 7 pages.

Written Opinion of the International Searching Authority for Application No. PCT/US2010/049663, mailed on Feb. 24, 2011, 9 pages.

International Search Report of the International Searching Authority for Application No. PCT/US2011/049589, mailed on Nov. 8, 2011, 5 pages.

Written Opinion of the International Searching Authority for Application No. PCT/US2011/049589, mailed on Nov. 8, 2011, 13 pages.

"Bluetooth: Connecting Your Devices"; 2009, http://web.archive.org/web/20070408235213/www.bluetooth.com/Bluetooth/Connect/Devi . . . , 2 pages.

"IEEE Standard for Information Technology: Part 11: Wireless LAN Medium Access Control (MAC) and Physical Layer (PHY) Specifications"; 2007, IEEE Computer Society, 145 pages.

Bernstein, Daniel J.; "Curve22519: New Diffie-Hellman Speed Records"; 2006, Public Key Cryptography, pp. 207-228, 22 pages.

Liu, Jingxin et al.; "A Password Based Authentication Protocol for Access Control in WLAN"; 2005, International Symposium on Communications and Information Technologies, vol. 2, pp. 1199-1102, 4 pages.

Wu, Thomas; "The Secure Remote Password Protocol"; 1998, Proceedings Internet Society Symposium on Network and Distributed System Security, pp. 1-17, 17 pages.

* cited by examiner

FIG. 4

```
uint8_t    elementID;    // Must be 0xDD (vendor specified element ID).
uint8_t    length;       // Number of bytes that follow this field. Must be 7.
uint8_t    oui[ 3 ];     // Organizationally Unique Identifier (OUI). Must be 0x00, 0x03, 0x93.
uint8_t    type;         // Must be 1 (product info).
uint8_t    productID;    // Apple Product ID of the device (e.g. 107 for AirPort Express with 802.11n).
uint8_t    reserved;     // Reserved for future use. Ignore when receiving. Set to 0 when sending.
uint8_t    flags;        // Flags bits indicating features and other state information.

0x01    Device has interference robustness enabled.
0x02    Device is in an unconfigured state.
0x04    Device detected remote PPPoE server.
0x20    Device supports WPS (WPS-capable).
0x40    WPS is active on the device (WPS-active).
0x80    Device supports SAW (SAW-capable).
```

400

| Name | Size | Value | Description |
|---|---|---|---|
| Element ID | 1 | 0xDD | Vendor specific as defined by [Ref. 2]. |
| Length | 1 | Variable | Number of bytes in the IE (excludes Element ID and Length bytes). |
| 2 | 3 | 0x00 0x17 0xF2 | Apple Inc. OUI |
| Type | 1 | 0x03 | IE Type |
| Sub IE | Variable | Variable | Sub IE with EasyConnect-specific element IDs. |

FIG. 4A

| Name | Size | Description |
|---|---|---|
| Element ID | 1 | Defined by the Element ID table [Ref]. |
| Length | 1 | Number of bytes in the Sub IE (excludes Element ID and Length bytes). |
| Payload | Variable | Specific to Element IDs defined in [Ref]. |

FIG. 4B

| Element ID | Name | Format | Description |
|---|---|---|---|
| 0x00 | Name | UTF-8 | Friendly name of the device (e.g. "Bob's iPhone"). |
| 0x01 | Model | UTF-8 | Machine-parsable model of the device (e.g. "MacBook2,3"). |
| 0x02 | Flags | BitArray | Flags providing information about the device as defined below:<br>Bit         Name            Description<br>0 (0x80)  APCapable    Access Point is capable of allowing enrollees onto its network via EasyConnect.<br>1 (0x40)  JoinWanted   Enrollee wants to join the network via EasyConnect. |
| 0x03 | OfferSubTypes | UTF-8 | Comma-separated list of DNS SRV service types [Ref. 6 ] for the services the device is offering (e.g. "_printer,_scanner"). For an AP, this tells the enrollee what features the enrollee is offering. For an enrollee, this tells the AP the services the enrollee is offering so it can convey that info to users via Bonjour sub types in the enrollee's Bonjour proxy. See the "Bonjour" section 4.3 of this document for details. |
| 0x04 | OfferTXT | TXTRecord | DNS-style TXT record [Ref. 5 ] containing key/value pairs for additional information the enrollee wants to provide. These key/value pairs will be added to the TXT record of the enrollee's Bonjour proxy. The enrollee must not use any key reserved by this document. See the "Bonjour" section 4.3 of this document for details. |
| 0x05 | SearchTypes | UTF-8 | Comma-separated list of DNS SRV service types [Ref. 6 ] if the enrollee is looking for a specific set of services (e.g. "_ap" if the enrollee is looking for an access point). This allows the AP to decide if wants to respond to enrollee (i.e. it has services the enrollee is interested in). The authorizer may use this to control the services the enrollee is allowed to access (e.g. may ask user "Do you want to allow 'Bob's iPhone' to use your computer to print?"). See the "Bonjour" section of this document for additional details. |
| 0x06 | AutorizedMACs | n * 6:MAC | Array of enrollee MAC addresses that have been authorized. The AP includes this in its probe responses so enrollees can tell if they have been authorized and should start WPS. There may be multiple enrollees active on the network, but not all of them may be authorized. This element allows enrollees to detect if they should start WPS or not. |

FIG. 4C

| WPS Attribute | Type | Description |
|---|---|---|
| Element ID | 0x1008 | Configuration methods supported by the enrollee (e.g. push button, PIN, etc.). |

802.11 header: <2:frame control> <2:duration> <6:destination address> <6:source address> <6:BSSID>

```
SAW header:
        1:category      127 (vendor specific)
        3:OUI           0x17, 0xF2, 0x01 (Apple OUI).
        1:type          0x01 (Apple SAW type)
        1:subType       0x01 (Apple SAW subtype)
        1:version       0x01 (Apple SAW version)
SAW body:               <WPS-style TLV's>
```

0x0001: UTF-8 Friendly Name. Should be <= 255 bytes.
0x0002: Reserved.
0x0003: Reserved.
0x0004: Reserved.
0x0005: Bonjour Sub-Types: Comma-separated list of Bonjour sub-types (e.g. _printer,_speaker).
0x0006: Bonjour TXT record: TXT record to be added. Must not contain keys specified in this document.
0x0007: Config Data: opaque configuration data a registrar provides to a device.

FIG. 7

```
"au"     -- [String] UUID from the registrar so multiple registrars can tell if their auth was accepted.
"ef"     -- [Integer] Flags about the enrollee.
           0x00 -- No flags set.
           0x01 -- Enrollee has been authorized by a registrar.
           0x02 -- Enrollee has successfully joined the network.
           0x04 -- Enrollee requires a PIN.
"err"    -- [Integer] Error code if the most recent join attempt failed.
"mac"    -- [String] REQUIRED: MAC address of the enrollee (e.g. 00:11:22:33:44:55).
"model"  -- [String] REQUIRED: Apple model property (e.g. AirPort4,107).
"nonce"  -- [Integer] Simple counter for change detection.
```

700

| Key | Format | Description |
|---|---|---|
| af | BitArrayString | Authorizer Flags. Flags to tell the authorizer the state of EasyConnect process:<br>Bit   Name   Description<br>0 (0x80) Authorized   Enrollee has been authorized by an authorizer (but not necessarily joined).<br>1 (0x40) Joined   Enrollee has successfully joined the network. |
| au | UTF-8 | Authorizer UUID [7] (e.g. "45d62245-a1c7-4e61-8c16-d6e14642824"). Only present if an enrollee has been authorized by an authorizer so multiple authorizers can tell if their authorization was accepted or if another authorizer did it. |
| cm | BitArrayString | Config Methods. This is a hex string version of the "Config Methods" (0x1008) element from the enrollee's WPS IE. See [Ref. 1] section 11 for details. |
| err | IntegerString | Error code if the most recent join attempt failed. |
| mac | MACAddressString | Enrollee MAC address (e.g. "00:11:22:33:44:55"). |
| model | UTF-8 | Enrollee model (e.g. "MacBook2,3") from the "model" element of the enrollee's EasyConnect IE. |
| nonce | IntegerString | Simple counter for change detection. This is updated whenever something about the enrollee or EasyConnect process changes. It allows the authorizer to detect when it needs to report changes, ask the user for information, etc. |

FIG. 7A

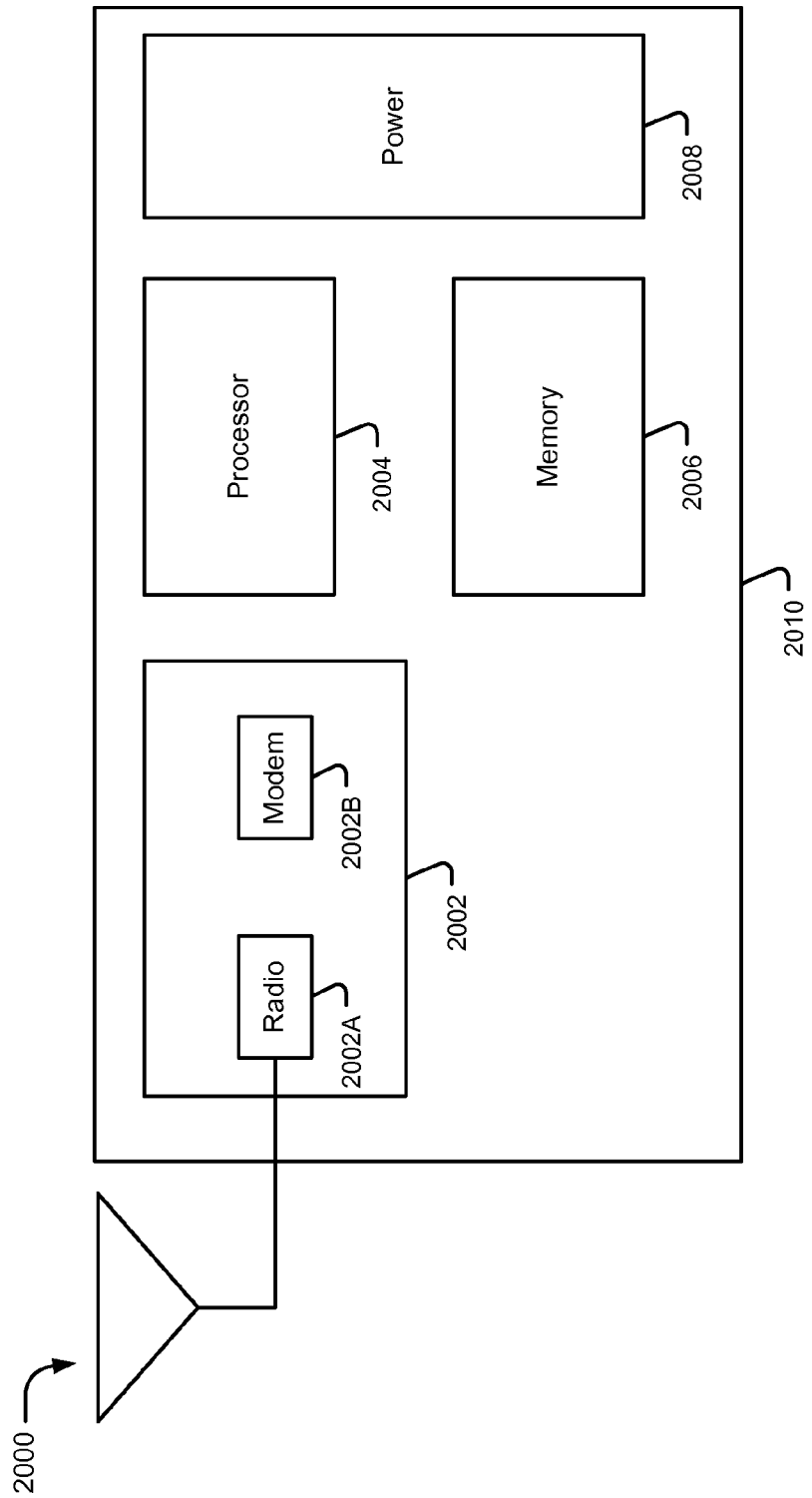

METHODS AND APPARATUS FOR SOLICITED ACTIVATION FOR PROTECTED WIRELESS NETWORKING

CROSS-REFERENCES TO RELATED APPLICATIONS

This application is a continuation-in-part of U.S. patent application Ser. No. 12/571,102, filed on Sep. 30, 2009, the entire contents of which are incorporated by reference herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The disclosure relates generally to the field of wireless communications and more particularly to methods and apparatus for the solicited addition of a wireless device to a wireless network.

Wi-Fi™ is a nearly ubiquitous wireless network (WLAN) technology, enabling connection of devices to the Internet, and ad hoc networking of devices. The relative ease and low cost of set up and administration for Wi-Fi™ networks has contributed to its wide deployment for residential and commercial use (e.g., coffee shops, bookstores, hotels, etc.).

Anecdotally, existing wireless encryption methods are difficult to use for a non-technical user, and may directly result in unsecure networks (e.g., if improperly setup, or not setup at all). Wired Equivalent Privacy (WEP) and the subsequent standards for Wi-Fi Protected Access (WPA and WPA2) are the current de facto standards for Wi-Fi network security. Wi-Fi Protected Setup (WPS) was introduced as an optional network security program by the Wi-Fi Alliance in early 2007. WPS provides an abbreviated network setup solution which reduces the number of actions required to set up a protected Wi-Fi network. WPS requires support of Wi-Fi Protected Access (WPA) or WPA2. The WPS protocol is targeted for non-technical users who know very little of wireless security and may be intimidated by the available security configurations of WPA-type systems.

BRIEF SUMMARY

Embodiments of the present invention provide, inter alia, improved apparatus and methods for the addition of a wireless device, such as a printing device, to a wireless network.

In some embodiments, a printing device can identify one or more access points that support a particular security protocol. Subsequently, the printing device can transmit access frames or probe requests to the identified access points. In response, an access point receiving a frame or request can publish information about the printing device to a network associated with the access point. An authorizer for the network (e.g., network member device such as a laptop computer) can determine whether the printing device is supported. The authorizer can further indicate to a user that the printing device is requesting to join the network, and whether the printing device is supported. Upon receiving an indication that the printing device is to be joined or enrolled onto the network, the printing device can send an authorization to the access point. In response, the access point can initiate an operation enabling the printing device to join the network. Upon successful enrollment of the printing device onto the network, the printing device can be ready to accept and perform print jobs from network member devices.

Other features and advantages of embodiments of the present invention will immediately be recognized by persons of ordinary skill in the art with reference to the attached drawings and detailed description of exemplary embodiments as given below.

BRIEF DESCRIPTION OF THE DRAWINGS

FIG. 4 illustrates one embodiment of a vendor specific information element (IE) adapted to indicate, inter alia, support for solicited access according to some embodiments of the present invention.

FIG. 4A is a graphical representation an IE in the context of an exemplary Solicited Activation of Wi-Fi Protected Setup (SAW) embodiment.

FIG. 4B is a graphical representation of one embodiment of a subIE format useful with some embodiments of the present invention.

FIG. 4C is a table illustrating one embodiment of implementation-specific subIE elements according to some embodiments of the present invention.

FIG. 4D is a graphical representation of one embodiment of a generic WPS IE according to some embodiments of the present invention.

FIG. 5 illustrates one embodiment of a vendor specific message adapted to indicate, inter alia, a request addition to a network supporting solicited access according to some embodiments of the present invention.

FIG. 6 illustrates one embodiment of a portion of the vendor specific message adapted to improve "human" usability, comprising a human readable text field, service discovery protocol information, and in-band configuration data according to some embodiments of the present invention.

FIG. 7 illustrates one embodiment of an application-specific text record adapted to provide service discovery information to members of a Local Area Network according to some embodiments of the present invention.

FIG. 7A is a graphical representation of one embodiment of a service discovery protocol-specific TXT record useful with some embodiments of the present invention.

FIG. 20 is a functional block diagram illustrating one embodiment of a wireless apparatus adapted to implement the methods of some embodiments of the present invention.

DETAILED DESCRIPTION

Figure 1:
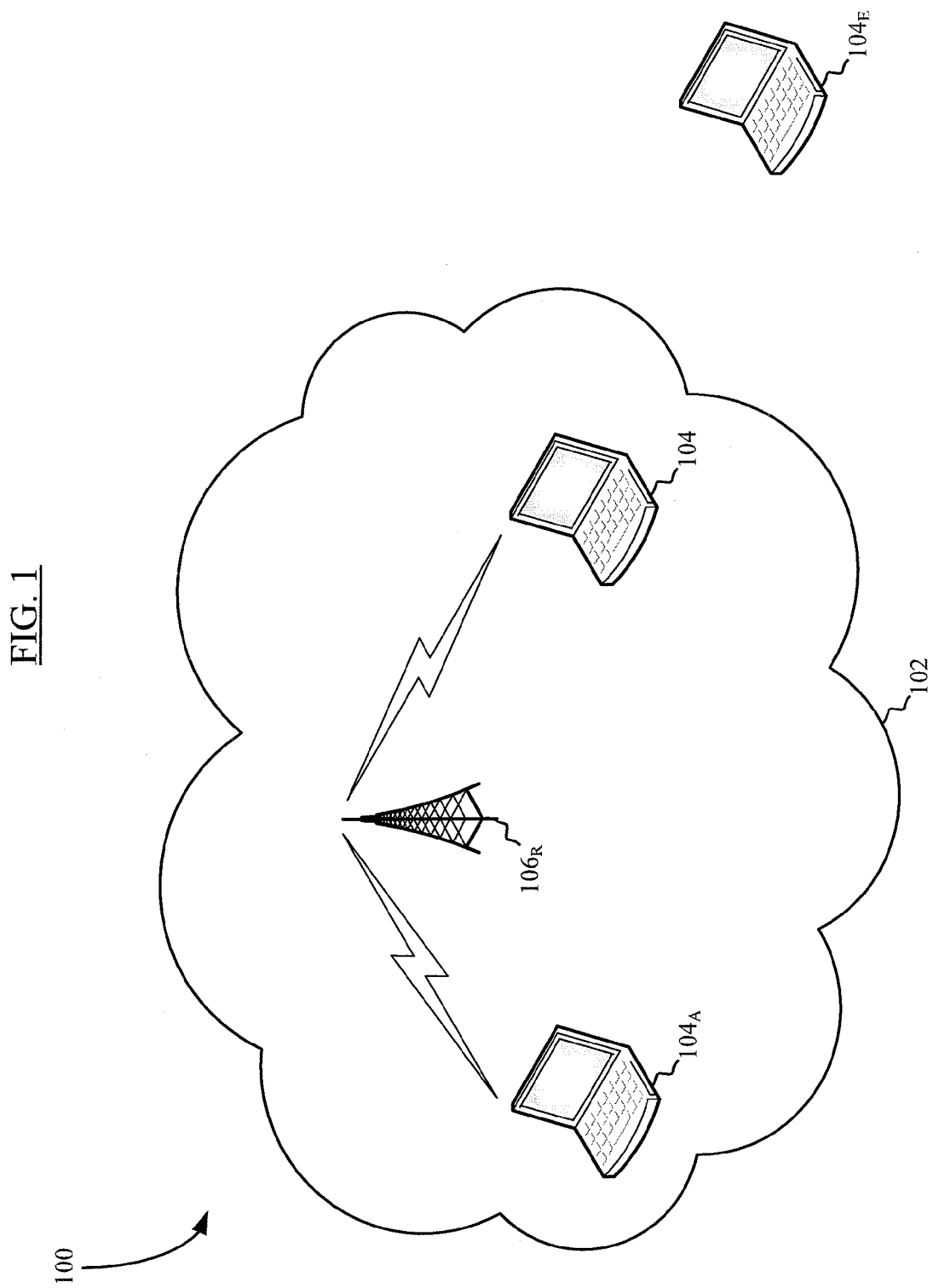
FIG. 1 is a functional block diagram of an exemplary WLAN (e.g., Wi-Fi) wireless network according to some embodiments of the invention.

Reference is now made to the drawings, wherein like numerals refer to like parts throughout.

Overview

Certain embodiments of the present invention leverage WPS enhancements to further improve the overall user experience. For example, improved apparatus and methods for solicited activation of wireless network security processes are provided. In some cases, these apparatus and methods allow a user or administrator to decide whether or not to add a new device to a wireless network, without the additional actions or knowledge currently required (such as selecting encryption protocols, providing user identifications, identifying oneself, etc.).

Furthermore, in some embodiments, the methods and apparatus described herein can interface with existing network restrictions transparently, thus remaining fully backward compatible with existing networks and apparatus. For example, some embodiments consider limitations of such networks (such as Wi-Fi Dynamic Frequency Selection (DFS)), responsively modifying their operation as appropriate.

Certain embodiments of the present invention provide methods and apparatus for a device to freely solicit access from an existing wireless network. Existing wireless networks have complex protocols for determining and granting such access, which lend themselves to a relatively high rate of user error. In one aspect, wireless networks are disclosed which reduce the number of required actions for all parties involved in such access requests, and may further reduce the number of parties required. Specifically, methods and apparatus are disclosed for use with enrollee devices that solicit access to a wireless network, and network devices which responsively add the enrollee device.

In one exemplary embodiment, methods and apparatus are disclosed enabling discovery and operations for Solicited Activation of Wi-Fi Protected Setup (SAW). A wireless device (the enrollee) performs a combination of active and passive wireless scans. The enrollee actively scans or probes all channels which are not prohibited by Dynamic Frequency Selection (DFS), and passively scans any DFS-prohibited channels. The enrollee checks each of the detected networks for SAW support. An Information Element (IE) describing SAW support is also disclosed herein for use in this process. For each network found that supports SAW, the enrollee may establish a WPS connection. The enrollee initiates the WPS abbreviated procedures for connection.

By reducing the overall actions required for network administration, processes requiring user input (such as authorization) can advantageously be performed from any device on the network, including "thin" clients. In one variant, enrollment of a wireless device can even be completed automatically when appropriate permissions are granted.

Also, by minimizing the user interface requirements for soliciting devices and/or using other devices as interface "proxies", a variety of "interface-less" clients may be enabled for network operation. In some cases, such interface-less clients may be entirely devoid of a user interface, thereby allowing for rapid and easy association of simpler and lower-cost devices. Such flexibility of networkable devices enables a plethora of new and useful network structures and/or client device types previously not possible.

The embodiments of the invention can also advantageously be employed in literally any functional context; e.g., with the aforementioned "enrollee" functioning as a client device, access point, proxy for another device, or as a peripheral.

Detailed Description of Exemplary Embodiments

Exemplary embodiments of the present invention are now described in detail. While these embodiments are primarily discussed in the context of a Wireless Local Area Network (WLAN) such as one compliant with the Wi-Fi standard(s), it will be recognized by those of ordinary skill that embodiments of the present invention are not so limited. In fact, the various embodiments of the invention are useful in any wireless network that can benefit from solicited activation of protected wireless access as is disclosed herein. Accordingly, as used herein, the term "wireless" means any wireless signal, data, communication, or other interface including without limitation Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, Wi-Fi (IEEE-Std 802.11x, including 802.11n and 802.11 "VHT"), WiMAX™ (802.16), MWBA/802.20, narrowband/FDMA, OFDM, PCS/DCS, analog cellular, CDPD, satellite systems, millimeter wave or microwave systems, acoustic, and infrared (i.e., IrDA), IMT-Advanced, IMT 2000, and 3GPP LTE (long term evolution)/LTE—advanced.

It will also be appreciated that while described primarily in the context of a single wireless network (e.g., WiMAX, LTE, WLAN, etc.), the methods and apparatus of embodiments of the present invention are also applicable to two or more networks which may even be heterogeneous in nature (e.g., different air interfaces, etc.) for improving overall connectivity.

FIG. 1 illustrates an exemplary WLAN (e.g., Wi-Fi) system 100 according to some embodiments of the invention. The Wi-Fi system 100 comprises a network 102 of one or more wireless clients 104, and an access point (AP) 106. In other Wi-Fi configurations, the network 102 may consist only of wireless clients 104 (no access point), engaged in an ad hoc peer-to-peer (P2P) network. As used herein, the terms "client", "client device", and "access point" may include, but are not limited to Wi-Fi capable devices, phones (such as for example an iPhone™), personal computers (PCs), such as for example a wireless-enabled iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As shown, a first wireless client 104A is a designated "authorizer" of the network 102 responsible for authorizing any additions to the network 102. Also shown is a wireless access point 106B operating as a "registrar". The registrar in this embodiment maintains the membership of the network 102. While the authorizer and registrar are shown as distinct elements, it is appreciated that they may be the same network element (e.g., a single entity may perform both acts of authorization and registration), and furthermore, that such capabilities are not limited to clients 104 or access points 106. For example, proxy devices (not shown) may perform the authorizer and registrar functions for other devices.

Also shown in FIG. 1 is a first wireless client 104E, which is not currently enrolled in the network 102 (i.e., is not registered with the registrar). The "enrollee" is requesting access to join the wireless network 102.

Referring to the Wi-Fi system 100 of FIG. 1, the extant WPS standard describes a variety of interchangeable variants and scenarios for adding the enrollee 104E to the WPS wireless network 102. The WPS standard identifies four (4) methods for authorization: (i) PIN access, (ii) Push Button Control (PBC) access, (iii) Near Field Communication (NFC) access or (iv) Universal Serial Bus (USB) access. These methods are described in greater detail below.

Wi-Fi Protected Setup (WPS) Authorization Methods

In each of the following access methods specified in WPS, one or more user actions must be performed by both the enrollee and the authorizer to prevent, inter alia, inadvertent additions, or malicious network activity.

(i) The WPS PIN (Personal Identification Number) access method utilizes a PIN to verify the enrollee. The PIN (e.g., read from a sticker, or a display, etc.) is entered at the representant of the network e.g., a wireless access point 106 or the registrar of the network.

(ii) The PBC (Push Button Control) access method requires the user(s) to push a button (either actual or virtual) on both the representant (wireless access point or registrar of the network), and the enrollee device. Support of PBC access is mandatory for wireless access points (APs), and optional for wireless client devices.

(iii) The NFC (Near Field Communication) access method utilizes a RFID (Radio Frequency Identification) passive radio device to verify the enrollee device. The enrollee is brought within range of a RFID capable representant, to allow RFID signaling. NFC Forum compliant RFID tags may be used. NFC is considered an "out-of-band" authorization method, since a RFID device (not a Wi-Fi type device) performs authorization via a different radio frequency. NFC access is optionally implemented within the WPS standard. See also "EPC Radio Frequency Identity Protocols Class 1 Generation-2 UHF RFID Protocol for Communications at 860 MHz-960 MHz—Version 1.0.9" dated January 2005, (commonly referred to as "EPC Gen 2"), which is incorporated herein by reference in its entirety.

(iv) The USB (Universal Serial Bus) access method authorizes the enrollee based on the insertion of a USB stick or "dongle". Similar to NFC, USB is considered an out-of-band authorization procedure. Support of USB access is also optional in the WPS standard.

Wi-Fi Protected Setup (WPS) Authorization Scenarios

Also, the WPS standard identifies at least three (3) basic scenarios for the addition of WPS users: 1) a wireless access point registrar $106_R$ adds an enrollee client device $104_E$; 2) a registrar client device $104_R$ adds an enrollee wireless access point 106E; and 3) registrar client device $104_R$ adds an enrollee client device $104_E$, via an intermediary wireless access point 106. More specifically:

1) In a first use scenario specified in WPS, a wireless access point with internal registrar capabilities adds an enrollee wireless client device. In this scenario, the session includes a series of Extensible Authentication Protocol (EAP) request and response messages. The session ends with the registrar access point disassociating from the enrollee device. The enrollee reconnects to the network with a secure configuration.

2) In the second use scenario, a registrar wireless client device configures a wireless access point as an enrollee. The configuration state of the wireless access point is set by the registrar (client device). The registrar may or may not reconfigure the wireless access point (enrollee).

3) In the third use scenario, the registrar wireless client device configures an enrollee wireless client device via a wireless access point. The wireless access point acts as an optional authenticator and/or mediator between the two wireless devices.

Methods

The following discussion augments the various aforementioned authorization methods and scenarios with solicited activation capabilities thereby improving user experience.

Figure 2:
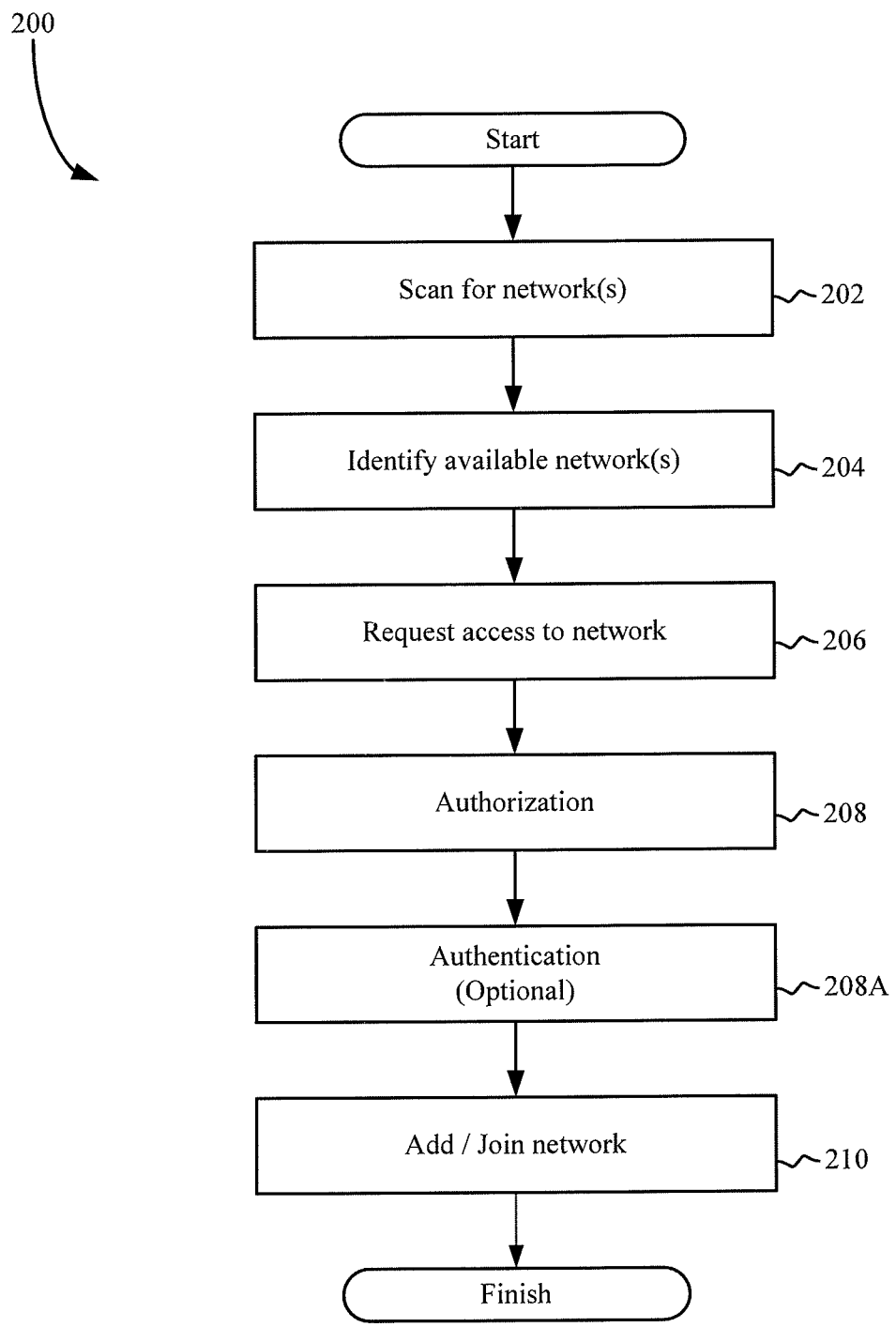
FIG. 2 is a logical flow diagram of the generalized process for solicited access to a secure wireless network according to some embodiments of the invention.

Referring now to FIG. 2, one embodiment of a generalized solicited activation method or procedure 200 for adding a device to an existing protected wireless network is described. It will be appreciated that while described in the context of a client device 104 soliciting access to an AP 106, the methodologies are in no way so limited.

The primary operative elements as described with respect to the methodology of FIG. 2 are one or more existing wireless networks, and a non-networked wireless device seeking access to the one or more existing wireless networks. The wireless network minimally includes two functional elements: the authorizer, and the registrar. In some embodiments, the authorizer and the registrar are the same device. In alternate embodiments, the authorizer and the registrar are two (or more) distinct devices. The non-networked device seeking network access is termed the enrollee. In some embodiments, the enrollee may be additionally required to successfully authenticate to the network. Thus in certain embodiments, the network may additionally comprise an authenticator. It is readily appreciated that the authenticator functionality may also be performed by the authorizer, or the registrar.

At block 202 of the method 200, the device 104 scans for one or more wireless networks. The scan may be active, passive or a combination thereof. The device 104 may scan only a subset of all resources, or may perform a full scan of all resources. Furthermore, in multi-mode clients, the scan may span resources associated with multiple different networks (e.g., Wi-Fi, WiMAX, etc.). The scan may be automatic, periodic, or triggered. For instance, in one embodiment, the scan is automatically initiated upon power up, or reset. In yet another embodiment, the scan periodically refreshes the available networks on a semi-frequent basis (e.g., hourly, daily, etc.). In yet a further embodiment, the scan may be triggered by one or more events, such as loss of reception (e.g., caused by movement of one device relative to another, etc.) or user interface interactions (e.g., pushing a button, selecting a function, etc.).

In an exemplary Wi-Fi embodiment, the scanning procedure is separated into two parts. In this embodiment, the scanning procedure is performed at device power up (during initialization), and includes a passive scan of a first channel subset, and an active scan of a second channel subset.

Specifically, during the first part, the device 104 passively scans a first frequency range subset corresponding to the Dynamic Frequency Scan (DFS) "prohibited" channels. DFS is a channel allocation scheme used in IEEE 802.11 Wi-Fi networks. DFS allows several neighboring wireless networks to coexist without central management. DFS implements bandwidth restrictions for each of the wireless networks. Accordingly, scanning of the first frequency range subset is a blind or semi-blind detection of "beacons" for DFS networks. Wi-Fi beacons are a specialized data transmission from wireless access points (AP) 106. The beacon signal includes the AP's Service Set Identifier (SSID), its active channel number (s) and one or more information elements (IEs) designating active security protocols. transmission beacon can be received by any client device 104 (i.e., it is unencrypted).

During the second of the two parts referenced above, the device 104 transmits probe signals on a second frequency range subset corresponding to the DFS "allowed" (i.e., or not prohibited) channels. Nearby Wi-Fi APs 106 or other enabled devices will responsively transmit a Probe Response or an Association Request/Response messages. Both responses carry Service Set Identifier (SSID), and one or more information elements (IEs) designating active security protocols. It is appreciated that in some embodiments, both the first and the second portion of the scan may be performed simultaneously or sequentially in either order.

It will be appreciated that various patterns of active/passive scan may be performed. For instance, in one variant, the scans are staggered in time, and have substantially no overlap. In another variant, the scans are staggered in time, but overlap to some prescribed degree. In yet another variant, the scans are asymmetric in time and/or other parameters (e.g., frequency bandwidth), such as where it is a priori known or expected that passive scans may yield better results than active scans (or vice versa). The scans may be interleaved or multiplexed, or even occur simultaneously, such as where radio frequency interference is not problematic (i.e., an active scan on one channel does not unduly interfere with a passive scan of another channel).

It is also noted that during the aforementioned "passive" scan of the prohibited channels, if a beacon or other signal is received, then a probe signal can be sent on the prohibited channel (i.e., the previously prohibited channel is no longer prohibited for transmission).

At block 204, the device 104 identifies one or more wireless networks 102 which support solicited activation. The determination may be based on e.g., an embedded information element, or alternatively based on information locally stored at the wireless device 104. For example, the device may maintain an internal database which identifies solicited activation capabilities, based on a received identifier (e.g., SSID). Yet other approaches are readily appreciated by others skilled in the arts.

In one exemplary Wi-Fi embodiment, the determination of solicited activation support is made at least in part by decoding an IE received in block 202. In this exemplary embodiment, the AP 106 broadcasts a signal comprising three (3) bits that identify i) support for Wi-Fi Protected Setup (WPS), ii) support for Solicited Activation of WPS (SAW), and iii) the current WPS mode (i.e., the AP is accepting SAW requests). The embodiment specific IE and its constituent bits are described in greater detail hereinafter.

In another exemplary embodiment (which in one embodiment is based on the SAW model described subsequently herein), the determination of solicited activation support is made at least in part by decoding a single IE received in block 202. In this embodiment, the AP 106 broadcasts a signal comprising an "APCapable" flag. The embodiment-specific IE and its constituent bits are described in greater detail hereinafter.

At block 206, the device seeking access (e.g., Wi-Fi "enrollee") requests access to one or more of the identified wireless networks which support solicited activation. The request may implement one or more security features. The request may comprise additional configuration information if desired or required. Such additional configuration information may include any of a plethora of supplemental information. Common examples of configuration include: the set of particular security modes which the enrollee supports, a human-recognizable identifier, software application-specific identifiers (e.g., Bonjour™ device types, Bonjour TXT records, etc.; see discussion provided subsequently herein of the exemplary Bonjour protocol developed by the Assignee hereof), in-band configuration data (e.g., printer toner settings, audio settings, etc.).

In one embodiment, if multiple compatible networks are nearby, the enrollee may send multiple simultaneous probe requests in parallel to save time. In another embodiment, blocks 204 and 206 may combine discovery and access requests, for example, if the enrollee performs its initial scans with a join request flag already set.

At block 208, the device seeking access is authorized by an existing device on the wireless network. While the existing device (e.g., authorizer) is necessarily different from the enrollee, the authorizer in the exemplary Wi-Fi context may be combined with other devices e.g., the registrar, the authenticator, etc. Alternatively, the authorizer may be a distinct device connected to the protected wireless network.

In some embodiments, the aforementioned configuration information identified in block 206 may be used by the authorizer if present, or displayed to a human user via the authorizer (e.g., on a setup display via a GUI). In other embodiments, the authorizer may additionally respond with configuration data of its own (which may or may not be symmetric in type with that sent by the requester). For instance, such additional configuration information may include: a selection of a set of security modes to be used, a human-recognizable identifier, software application-specific identifiers (e.g., Medium Access Control (MAC) addresses), and in-band configuration data (e.g., printer settings, audio settings, etc.).

At block 208A, the enrollee is optionally authenticated by an authenticator device on the wireless network. While the authenticator is necessarily different from the enrollee, the authenticator may be combined with any of the authorizer, or the registrar device, or comprise a separate entity altogether and/or operate via a proxy device or process). In some embodiments, the aforementioned configuration information identified in block 206 is used for authenticating the enrollee, and the authenticator may additionally respond with authentication information (e.g., to support two-way authentication). Common examples of authentication processes and security approaches that may be used consistent with embodiments of the invention include: public/private key pair exchange, MD5 (Message Digest Algorithm 5), SHA (Secure Hashing Algorithm), AES (Advanced Encryption Standard), stream ciphers, etc. Wi-Fi specific authentication embodiments include for example WEP, WPA, and WPA2. In one exemplary embodiment, the authenticator is the same entity as the authorizer and uses HTTPS (Hypertext Transfer Protocol Secure). Standard SSL (Secure Sockets Layer)/TLS (Transport Layer Security) is used for encryption, and HTTP digest authentication is used for authentication.

At block 210, the enrollee is added to one or more of the identified wireless networks. During this block, the enrollee may additionally configure one or more internal device settings in accordance with configuration information extracted from blocks 206 and/or 208.

In one exemplary Wi-Fi based embodiment, the authorization and authentication actions are separate. In one variant, once the Wi-Fi enrollee is authorized, it proceeds to execute a WPS authentication sequence. Once authenticated, the wireless network updates the registrar. The new membership is also propagated to other networked devices. The newly added member may additionally configure its internal device settings accordingly (e.g., updating its namespace, setting its MAC address, etc.).

Figure 3:
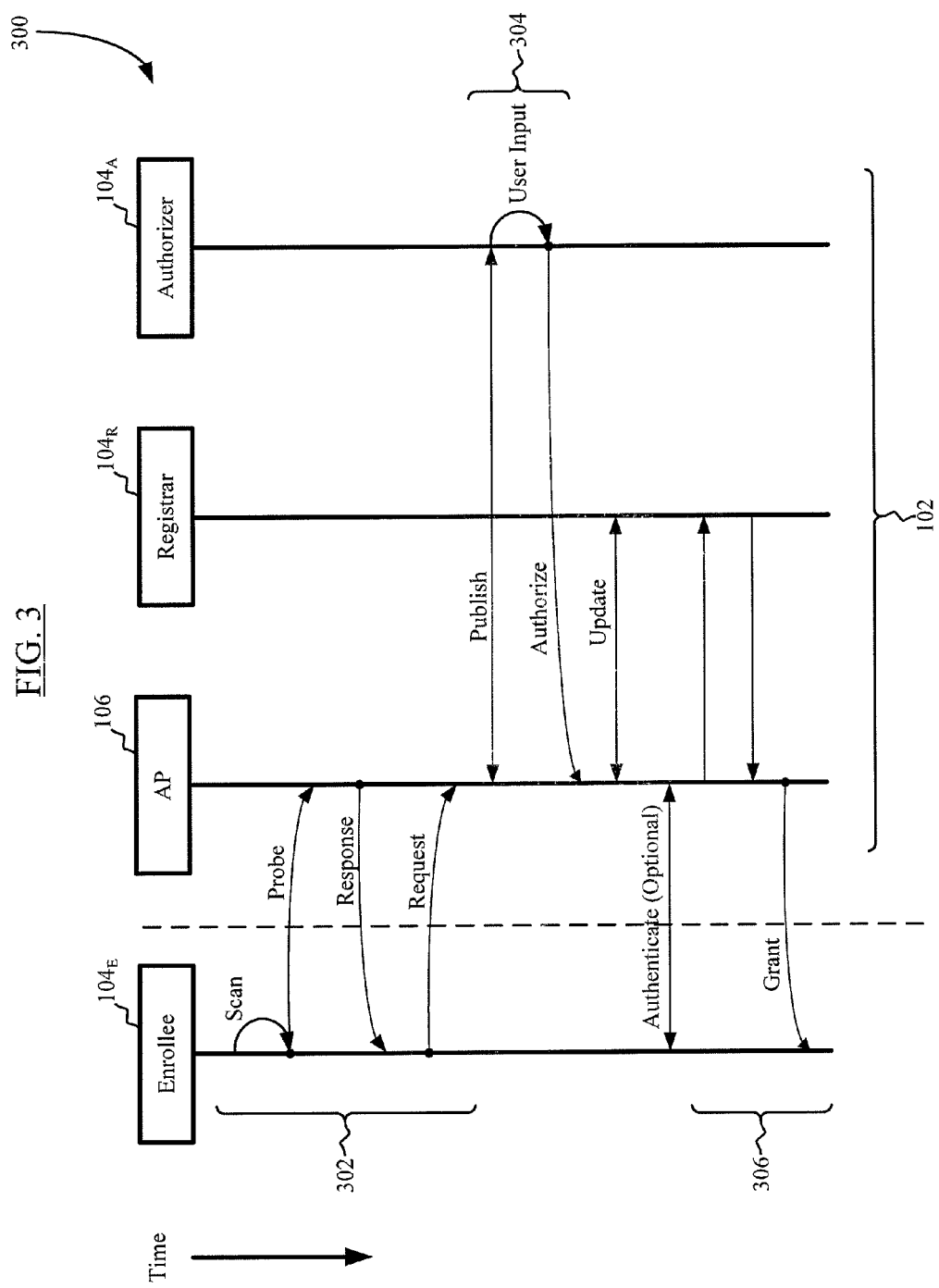
FIG. 3 is a ladder diagram of one embodiment of the generalized process for solicited access to a secure wireless network of FIG. 2, as implemented among four distinct entities.

Referring now to FIG. 3, a ladder diagram illustration of one exemplary embodiment of solicited activation methodology 200 of FIG. 2 is shown. It will be appreciated that while the following example is described primarily in terms of Wi-Fi enabled devices and exemplary protocols, these contexts are merely illustrative, and embodiments of the present invention may be broadly applied to other WLAN and wireless technologies and/or other embodiment protocols.

The primary operative elements as described with respect to the methodology of FIG. 3 are one or more existing wireless networks 102, and a non-networked wireless device (i.e., the enrollee $104_E$). The existing wireless networks 102 can comprise (as little as) a single entity performing access point, authorizer and registrar device functionalities. For clarity, the wireless network 102 in the example of FIG. 3 is shown as three discrete entities, a first device (i.e., the authorizer $104_A$), a second device (i.e., the registrar $104_R$), and an access point 106. A non-networked third device (i.e., the enrollee $104_E$) identifies and requests access to its nearby networks 102. Transactions within the wireless network 102 are "protected" using one or more encryption protocols (e.g., WPS). In one exemplary embodiment, the registrar $104_R$ is the access point 106 of a device providing access. The authorizer 104A is an external entity communicating with the registrar to authorize the enrollee to get onto the network. For example, a printer is an enrollee $104_E$ trying to get onto a wireless network (e.g., "My Network"), provided by an access point. A computer already joined to the wireless network acts as an authorizer to "tell" the access point that it should allow the printer to join the network.

At a first time 302, the enrollee $104_E$ scans for one or more wireless networks, and identifies a nearby wireless network 102 served by an AP 106. The enrollee $104_E$ requests access to the wireless network 102. As shown in FIG. 3, the initial detection of the nearby wireless network is performed in this embodiment by passively scanning for networks, and actively transmitting a probe. The AP 106 replies to the probe with a response carrying one or more parameters identifying support for solicited access to the network. Based on the parameters, the enrollee $104_E$ may decide to connect to the network. The enrollee $104_E$ transmits a request to connect to the network 102 to the AP 106.

Specifically, in the aforementioned scan for a WPS based system, the enrollee $104_E$ passively scans any DFS-prohibited channels for beacons. Once the passive scans have concluded, the enrollee $104_E$ performs an active scan (e.g., sends probe requests) on all channels not prohibited by Dynamic Frequency Selection (DFS).

The exemplary enrollee $104_E$ determines all available SAW capable networks by reading one or more information elements (IE). Information Elements (IEs) are specified within the IEEE 802.11 wireless LAN protocol. IEs provide descriptive information, and are embedded within management frames in Type-Length-Value (TLV) definitions. The IEEE 802.11 standard also provides for vendor specific TLV definitions.

In the exemplary Wi-Fi embodiment, the SAW-capable network sets a SAW-capable bit within either a generic, or vendor specific IE which is either broadcast for passive reception, or actively sent responsive to a probe. FIG. 4 illustrates one embodiment of a vendor-specific IE 400 useful with embodiments of the present invention. The illustrated vendor-specific IE includes a sequence of unsigned integers representing: an element identification, a length of the TLV, a organizationally unique identifier (OUI), type, product identification reserved bits, and flag bits, although it will be recognized that other information and sequences may be used with equal success.

Networks that support WPS identify such support by setting two flag bits: WPS capable (0x20), and SAW-capable (0x80). Furthermore, a third flag bit, WPS active (0x40), is also considered during solicitation activation process. In certain embodiments, the presence of WPS capability is assumed (e.g., only the SAW bit is used). All other networks are ignored by the enrollee $104_E$. It is further appreciated that while the aforementioned TLV is a vendor specific embodiment of a general IE, in alternative embodiments, such bits may be generically standardized and understood by any enrollee device $104_E$. Furthermore, in some embodiments, information germane to SAW and WPS may be disseminated with multiple TLV exchanges. Alternatively, other methods for identifying solicited activation support and activity may be used within other network technologies. For example, in alternate systems, such parameters may be broadcast via a control channel, e.g., one used in a UMTS femtocell or cellular network.

In one embodiment of the present invention, the SAW-capable network sets the "APCapable" flag within an SAW specific IE. FIG. 4A illustrates an exemplary SAW specific IE. This SAW specific IE includes a sequence of unsigned integers representing: (i) the element identification, (ii) the length, (iii) the organization-unique identifier, (iv) the type, and (v) one or more subIEs.

FIG. 4B illustrates one embodiment of the subIE format. Each subIE comprises an element ID, a length and a payload.

FIG. 4C is a table of embodiment-specific subIE elements according to one embodiment of the invention. In addition to the SAW IE, a generic WPS IE (shown in FIG. 4D) is also required for SAW operation, for designating the configuration methods supported by the enrollee. In other embodiments, the generic WPS IE is not required, as SAW operation implies WPS support.

Once the enrollee 104E has selected an available SAW network, the enrollee $104_E$ requests access to the selected SAW network. In the generic Wi-Fi embodiment, the enrollee $104_E$ sends a special IEEE 802.11 action frame or probe request indicating an SAW request. FIG. 5 illustrates one embodiment of a vendor-specific action frame or probe request 500. The action frame or probe request 500 of this embodiment includes a generic IEEE 802.11 header, a SAW-specific header, and a SAW-specific body although it will be recognized that other information may be used with equal success.

The exemplary SAW-specific header of FIG. 5 includes a category, an organizationally unique identifier (OUI), a type, a subtype, and a version. In some alternate embodiments, the version field may not be required. The SAW-specific header may be used by the registrar (i.e., the intended recipient) 1048 internally to assist in software organization, and efficiency.

In one embodiment, the exemplary SAW-specific body includes a vendor specific TLV. For example, the vendor data may be formatted as a WPS-style TLV i.e., the WPS vendor-specific TLV may be partitioned into sub-TLVs. See FIG. 6, which illustrates one embodiment of a vendor-specific TLV 600. The vendor specific TLV 600 includes a text readable name, a service discovery subtype, a service discovery TXT record, and configuration data. These sub-TLVs are described in greater detail below.

A text name (i.e., human readable) of the enrollee $104_E$ allows an AP 106, registrar $104_R$, or authorizer $104_A$ to display the name of the enrollee $104_E$ to a user via a GUI or other mechanism. In current WPS standards, the existing descriptor fields (e.g., Device Name) are too short (32 bytes) to accommodate useful human readable names. Accordingly, in the exemplary vendor specific TLV, a text readable name field is provided for e.g., display with user interfaces, etc. In alternative embodiments, a UTF-8 friendly name with no fixed length limit (or at least a reasonable limit, such as 255 bytes) may be codified as a generic WPS attribute (i.e., no additional text readable field necessary). In one exemplary embodiment, the authorizer and the AP/registrar utilize a UTF-8 name from the SAW IE. The AP/Registrar uses the UTF-8 name from the SAW IE for service discovery publications. Similarly, the Authorizer may require Service discovery text information for UI display to authorizing users.

Configuration data provides enrollee $104_E$ specific configuration data, to be used when the enrollee $104_E$ is accepted onto the network. In-band configuration of devices is described in greater detail in later sections (see "In-Band Configuration" discussion provided subsequently herein).

Configuration mode specifies the mode the enrollee $104_E$ supports. This tells the representant (e.g., the AP 106, or the registrar $104_R$) whether the enrollee $104_E$ supports PIN mode, or push button mode. The AP 106 will publish this information, and the registrar $104_R$ will use it to customize the user interface for letting the enrollee 104E onto the network.

Service Discovery Protocol

In one embodiment, a TLV is provided that leverages an extant service discovery program. In one embodiment, for example, the Bonjour protocol developed by Apple Inc., the Assignee hereof, may be used. Bonjour is currently utilized in; inter alia, the Mac OS X operating system (from version 10.2 onwards), and can be used on Microsoft Windows® operating systems (when installed). However, other service discovery protocols exist, and are appreciably interchangeable.

The exemplary service discovery protocol is intended for use on inter alia, local area networks (LANs) to locate devices such as printers, as well as other computers and file sharing servers, and the services that those devices offer. It can also used by content services (e.g., iTunes®) to find shared music, iPhoto® to find shared photos, iChat, to find other users on the local network, and TiVo Desktop to find digital video recorders and shared media libraries, among other uses. Accordingly, the exemplary service discovery protocol is one particularly useful protocol adapted to discover services on a local area network. The exemplary service discovery protocol sub-types specify one or more device sub-types to be used when registering the enrollee $104_E$ on the local area network. The exemplary service discovery protocol sub-types are discussed in greater detail below.

Service discovery protocol TXT record specifies the service discovery protocol TXT record entries to add to the text record, when registering the enrollee on the LAN. For example, a printer may want to identify certain features that are needed for configuration.

In certain embodiments, the request for solicited activation is made by sending a probe request containing an SAW IE with the "Join Wanted" flag set in the "flags" subIE. The enrollee includes information about itself in the SAW IE (e.g., name, model, Bonjour TXT record, etc.).

Members can search the available the service discovery protocol entries, such as by sub-type. The service discovery protocol sub-types may be used to further identify the type of device. In some embodiments, the service discovery protocol allows multiple sub-types to be used concurrently in an attribute-like manner. For example, a given type of device (e.g., an AirPort Express™ device of the type manufactured by Apple Inc., the Assignee hereof) may be "sub-typed" as an AP, a remote speaker, and a remote printer simultaneously. Consequently, the device may enumerate itself as any combination of device attributes (e.g., _SAW, _tcp, _ap, _printer, speaker).

Referring back to the solicited activation procedure 300 of FIG. 3, at the conclusion of block 302, the enrollee sends the aforementioned action frame 500 or probe request to one or more SAW compatible networks.

At a second time 304, the AP 106 forwards the request to the registrar $104_R$ and authorizer $104_A$. The authorizer $104_A$ performs access control and accepts or denies the enrollee $104_E$, based for example on one or more inputs from a user (e.g., received via a user interface such as a keypad, touch screen, mouse, etc.). The authorizer's response is forwarded back to the registrar $104_R$.

Specifically, in the Wi-Fi embodiment, if an AP 106 receives the action frame or probe request and is willing to accept the enrollee $104_E$, then it will publish a service discovery protocol service on its LAN to notify LAN members of the requesting enrollee $104_E$. In some embodiments, the service discovery protocol provides a high level application which advantageously does not require additional IEEE 802.11 support for the members already on the network. An authorizer may browse for the service discovery protocol proxy services published by the AP.

In the illustrated embodiment, the publication of the device presents the text readable name of the enrollee $104_E$ (e.g., "Living Room") for display to an authorizer GUI. The publication of the device specifies a port number in the service record (e.g., SRV) that can be used by the registrar $104_R$ to allow the enrollee $104_E$ on the wireless network (for example, Airport Configuration Protocol (ACP) port 5009). Additionally, the text record keys are defined for additional information about the enrollee. FIG. 7 illustrated one embodiment of a vendor specific text record 700.

In one embodiment, the exemplary text record 700 includes: identification of a registrar; one or more flags indicating enrollee status; an enrollee $104_E$ unique indicator (e.g., a MAC address); and or a cryptographic seed. In one variant, a nonce is additionally provided as a unique number to assist in change detection (i.e., if the nonce has changed, then the network status has changed and requires updating). In one variant, the MAC address is used to uniquely identify the enrollee.

While the foregoing vendor specific text record 700 is described within the framework of embodiments of the present invention, it is appreciated that alternative methods to allow an enrollee onto the network may likewise be defined. For example, an alternate text record may identify protocols usable with the AP via the Bonjour™ TXT record, including at least one configuration protocol, such as HTTP.

FIG. 7A illustrates one embodiment of a service discovery protocol specific TXT record. In some embodiments, the service discovery protocol TXT record keys indicate additional state information about the enrollee, derived from the one or one or more elements of the SAW IE. The service discovery protocol embodiment of the TXT record provides: authorizer flags, authorizer UUID, configuration methods, error codes, the enrollee's MAC address, enrollee device model, and a change nonce.

In one embodiment, the AP publishes a service discovery protocol TXT record on its LAN to represent the enrollee. The publication of the TXT record allows members of the AP to discover the enrollee.

Ideally, when an enrollee 104E is detected, the user is notified (by either the registrar $104_R$ or the authorizer $104_A$). In one exemplary notification process, the notification does not grab or steal focus from whatever the user is presently doing, or prospectively annoy the user by popping up windows in an unsolicited fashion. For example, one non-intrusive notification indicator according to embodiments of the present invention includes a small icon and label displayed in the "devices" section of an extant window or sidebar (e.g., the iTunes™ sidebar, or the Mac OS X Finder™ sidebar). If the user selects the enrollee device $104_E$, a user interface for adding the enrollee $104_E$ onto the network is initiated, including any optional configuration information settings.

Ideally, measures should be taken to ensure that the enrollee is actually wanted by the authorizer (as opposed to an unwanted enrollee, such as a neighbor's device). In the exemplary embodiments, the user will most likely be expecting the notification from the enrollee. However, it is appreciated that in other situations, unexpected notifications may still be of interest to the user. For example, a user may "stumble" across an advertised service, etc.

In the exemplary embodiment, the user input is selected from the aforementioned WPS access methods previously discussed. The authorizer $104_A$ presents a UI to enter a PIN (which may be e.g., printed on the case of the enrollee, randomly generated PIN displayed on the enrollee, selected by the user themselves, etc.). Once the user enters the PIN, the authorizer $104_A$ will communicate with the TCP server (of the AP), specified in the illustrated embodiment by the service discovery protocol service. The registrar $104_R$ then will allow the enrollee onto the network.

For example, in one such embodiment an authorizing device (e.g., iPhone, Mac, Windows computer, or other device) may present a dialog box for entering the enrollee's PIN, and an "Authorize" button or interface. The user may read the enrollee's PIN from the device, and "Authorize" the new addition by pressing the button. Responsively, the authorizing device will communicate with the registrar to allow the enrollee onto the network. The authorizer initiates communication with the TCP server which has previously advertised itself. The AP initiates WPS mode. The authorizing device updates the Service discovery protocol TXT record of the AP with UUID (universally unique ID), a PIN (optional), config data, and the enrollee's MAC address. The AP uses this information to allow the enrollee onto the network.

When the authorization process starts on the AP, the AP updates the enrollee's Service discovery protocol proxy to set the "Authorized" flag of the TXT record item (i.e.: "af") to reflect the current authorized status. Other authorizing devices monitoring the AP will disregard the presence of the new enrollee (i.e., to prevent duplicative authorizations). The AP adds the UUID of the authorizer via the "au" (i.e., authorizer ID) key to the TXT record of the Service discovery protocol proxy. Other authorizing devices are thus notified which authorizing device had authorized the new enrollee. In some instances, the other authorizing devices may mirror the authorization process, whereas for other embodiments, the authorizing devices may prefer to disregard messages from the new enrollee.

Furthermore, the registrar $104_R$ may have configuration options to control which member may be the authorizer $104_A$ for an enrollee $104_E$. For example, the registrar $104_R$ may choose to allow any member of its LAN to be an authorizer $104_A$; or, conversely, it may require an administrative password and/or privileges. The registrar $104_R$ in one variant never allows authorization from a non-member device (i.e., a device outside of its LAN) without some form of authentication and encryption it (e.g., a password-protected, encrypted VPN tunnel).

Finally, at a third time 306 of FIG. 3, the registrar $104_R$ adds the enrollee $104_E$ to the network. Adding of the enrollee $104_E$ may be contingent upon one or more supplemental operations. For example, in some embodiments, the enrollee $104_E$ may additionally be required to perform multiple authentication responses. In another example, the enrollee $104_E$ may additionally be required to set one or more parameters for device operation.

In the foregoing exemplary embodiment, once the access point 106 has entered WPS mode, the access point 106 will set the WPS active bit in the vendor specific IE to indicate to the enrollee $104_E$ that the access point 106 has enabled WPS. Additionally, it includes the MAC address of the enrollee $104_E$ in the IE, thus explicitly identifying the enrollee $104_E$. This allows the enrollee $104_E$ to ignore other access points that may also have WPS active, or are active for a different enrollee $104_E$.

When the enrollee $104_E$ sees that an AP 106 has activated WPS and is advertising the enrollee's MAC address, the enrollee $104_E$ will try to join that network via WPS. If the join is successful, the AP 106 will turn off WPS, return to normal operation, and update the Service discovery protocol TXT record to indicate the enrollee $104_E$ has successfully joined.

After the enrollee $104_E$ successfully joins, the AP 106 de-registers the Service discovery protocol service. In some embodiments, the Service discovery protocol service is left active for a short period (e.g., one minute) after the enrollee $104_E$ has joined. This allows the registrar $104_R$ (which may be different from the access point) to detect that the enrollee $104_E$ has successfully joined.

If the join fails, the access point 106 will update the Service discovery protocol TXT record to include the error code (i.e., "err" TXT record), increment a cryptographic element such as a nonce (e.g., a cryptographic seed used to prevent playback attacks), and return to an "unauthorized" state (i.e., deflault "af"). This allows the registrar $104_R$ to detect that the join failed.

The following discussions describe additional considerations relating to, and variations of, one or more embodiments of the invention.

Security and Access Limitations

No wireless access protocol is completely secure. In fact, security systems are generally described with responses to a brute force attack (e.g., repeated attempts), because such metrics are compared easily. Accordingly, a large number of possible schemes exist to enforce network security. These are well known throughout the arts, and generally include (without limitation): increasing time intervals between subsequent retries; limiting the number of retries; and limiting the membership of the network (such as via PINs, authentication, requirement for key pairs, etc.). It is readily appreciated that any of the foregoing methods are readily applicable and useful with embodiments of the present invention described herein, either individually or in combination. While a user should not be granted limitless access to repeatedly retry, some scenarios are purposely constructed to be more forgiving than others.

For example, in the foregoing exemplary embodiment of FIGS. 2-3, the Wi-Fi system is intended for use with a non-technical audience; accordingly, the enrollee should be allowed to retry multiple times (say for example five), but not unreasonably so. One likely cause of failure is the user entering the wrong PIN. Accordingly, the registrar may opt to prompt the user for the PIN again. The registrar will need to reauthorize for the enrollee to attempt another join. Care must be exercised in retry attempts to prevent the aforementioned "brute force" attacks. Consequently, if an enrollee repeatedly fails, defensive countermeasures can be taken.

In one exemplary embodiment, an enrollee may retry failed connections multiple times, by simply "waiting". For instance, the enrollee fails to join the network (e.g., the user entered the PIN incorrectly), the enrollee must wait an exponentially increasing interval between retries. Such a "delay" type scheme grows beyond a practical limit for repeated failed attempt, thereby frustrating surreptitious access attempts. If a request is received from an enrollee, additional requests will be dropped for increasing periods of time: 2 seconds, 4 seconds, 8 seconds, etc.

In yet another exemplary embodiment, an enrollee may consecutively retry failed connections only a limited number of times up to a prescribed threshold; for example, three (3) times. A "locking" type scheme is used to silently reject attempts for access once the locking threshold has been reached. A simple counter tracks the number of failed connections; for each failed connection attempt, the counter increments. In some embodiments, the counter may reset upon successful connection. Once the locking threshold has been reached, the enrollee can be forced to require external assistance. For example, a networked member (e.g., the authorizer) may be required to reset the connection failure counter.

In yet another exemplary embodiment, the registrar is limited to a set number of active enrollees at any one time. For example, in one embodiment, there can be at most five (5) active enrollees any time. If there are five (5) active and recent enrollees, and another enrollee requests access, then the new enrollee will be silently dropped (i.e., the authorizer is not notified of any enrollee request). In this embodiment, an enrollee is considered "active" if the AP has received a SAW action frame or probe request from the device within a prescribed time interval (e.g., 3 minutes). Accordingly, within this system, enrollees can be required to send SAW action frames or probe requests periodically to remain active.

Furthermore, other variants within a membership-based scheme are also possible. For example, various gradations or categorizations may be useful. In one scenario, an enrollee is considered "recent" if the first SAW action frame or probe request the AP received from that enrollee was in the last n minutes (e.g., 3 minutes). If there are 5 active enrollees, but only 4 recent enrollees, then the AP can drop the "quiet" enrollee to make room for the new enrollee.

Furthermore, there may be certain prioritized clients which are never "kicked". For example, a user may decide that a particular client is always allowed, even when rarely used. Such designations may be useful for entities such as network based storage, or media servers.

In-Band Configuration

A significant consideration in implementing embodiments of the present invention is improvement to user experience (including ease and rapidity with which desired device connections can be established). One salient problem with extant methods of wireless discovery and management relates to a lack of user input in the network setup process. Specifically, solicited activation enables the addition of user-interface-less clients to wireless networks.

Accordingly, In-band configuration provided by embodiments of the present invention enables the user to provide some degree of minimal configuration as part of the WPS negotiation process. For example, this may allow a registrar to let the user choose a name for the device, provide an administrative password, and other utility options. Device configuration is generally handled via existing device specific software, thus device configuration via embodiments of the present invention is not intended to be a complete configuration protocol. Instead, it augments extant device configuration methods, to improve the overall user experience by reducing the number of user interfaces the user needs to interact with.

For example, when a customer first receives a device, the device generally has factory settings, which in some cases are not desirable or applicable to the intended use(s). Factory programmed device names are typically not intelligible, and device passwords are usually not sensible or readily recalled by a given user. Even though the present method may greatly facilitate network setup, the device itself may be poorly named (e.g., "Device 001122"). Accordingly, in one embodiment of the invention, SAW methods provide an in-band configuration menu or other user interface to enable enhanced user input and experience. In-band configuration data is provided or generated by the authorizer, registrar and/or enrollee. The format of the configuration data is made flexible for multiple uses, but remains within the constraints of SAW. In one exemplary use case, the access point delivers one or more user configurations to the enrollee as part of the "Encrypted Settings" section of Message M8 (see section 7.3.9 of [1] for details). In one exemplary embodiment, the in-band configuration parameters comprise a name and a password for the device. In other exemplary embodiments, the in-band configuration parameters may be used to exchange device specific parameters (such as a text name for the print queue of a printer, etc.).

Example Operation Scenarios

The following examples illustrate one or more embodiments of the invention disclosed herein.

In one example scenario, a customer powers on a wireless networking device with audio speaker capabilities (e.g., an AirPort Express device manufactured by the Assignee hereof). This device does not have an indigenous user interface. Instead, authorization of the device is performed by the customer who has a concurrently running Solicited Activation Wi-Fi (SAW) registrar application running on their PDA or smartphone (e.g., iPhone). The PDA or smartphone displays a list of nearby devices compliant with SAW (including the wireless audio device). The customer authorizes the wireless audio device to join the network via the PDA/smartphone user interface. The wireless audio device connects to the network, and is represented within a host software application (e.g., an iTunes application running on the PDA or smartphone, or a nearby laptop computer) as a remote audio speaker.

Referring now to FIGS. 8-13, embodiments of the invention implementing the scenario above are described in detail. Specifically, in this illustration, the user adds an enrollee device (e.g., AirPort Express) to a wireless network provided by an access point performing the registrar functions (e.g., Time Capsule™ device manufactured by the Assignee hereof). The enrollee device executes a first enrollee process 800 shown in FIG. 8. The access point executes a host access point daemon process 900 shown in FIG. 9, and Configuration Protocol (CP) daemon process (FIGS. 10-13).

Figure 8:
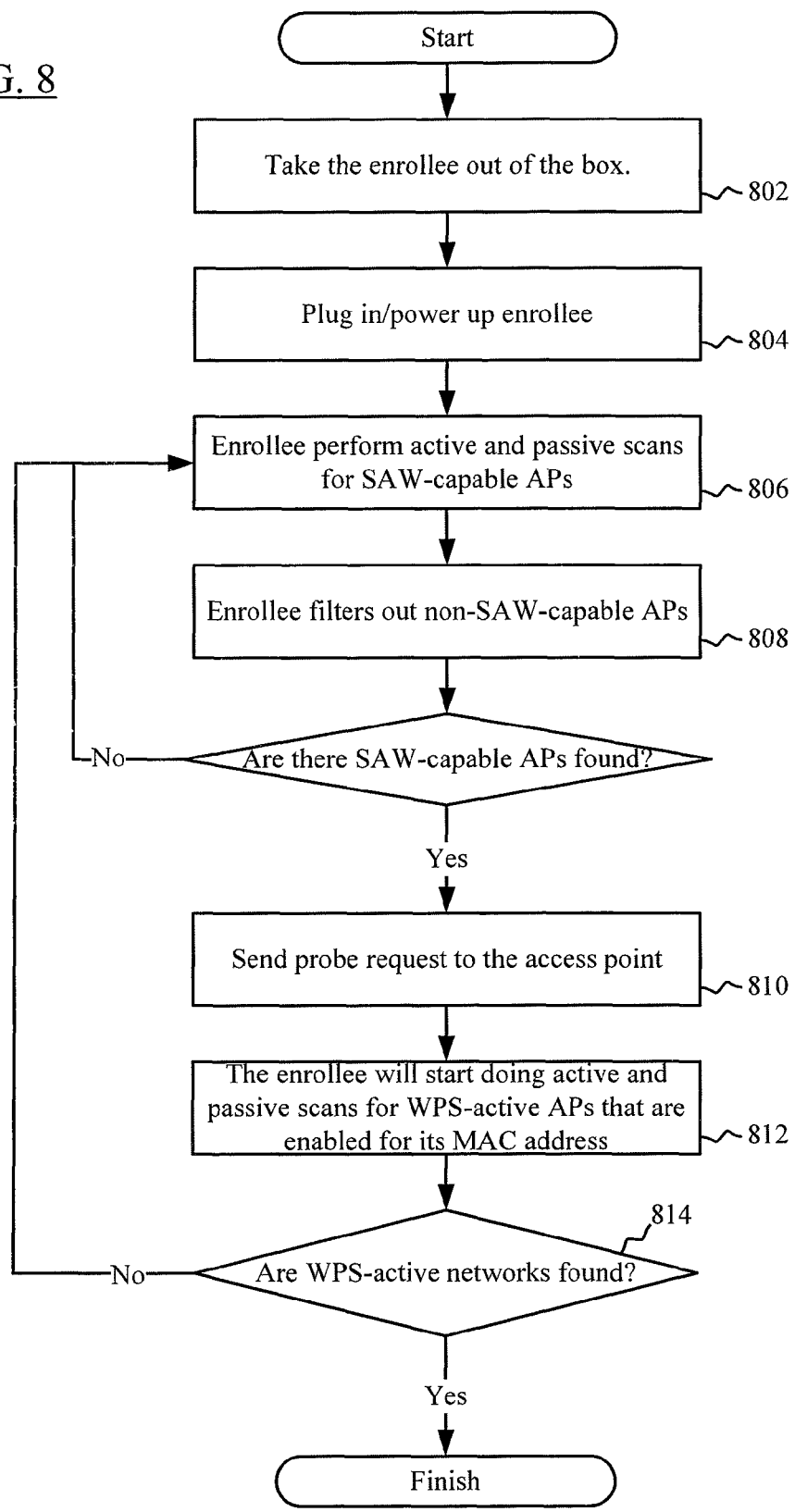
FIG. 8 illustrates one embodiment of an enrollee process executed by a wireless media-capable accessory according to some embodiments of the present invention.

Referring now to FIG. 8, at block 802 the enrollee device is taken out of the box and plugged in to a wall outlet or other power source at block 804. At block 806, the enrollee device powers on, and initiates a series of active and passive scans for SAW-capable APs. The enrollee device identifies all SAW-capable APs, and filters out all non-SAW-capable APs at block 808. If the enrollee device cannot identify any SAW-capable APs, then the enrollee device will continue scanning.

For each SAW-capable network the enrollee device finds, it sends SAW action frame or probe request to the access point at block 810. Responsive to the action frame or probe request, the nearby identified SAW-capable APs will identify itself with a WPS-active flag, and a MAC address corresponding to the enrollee device. This process is described in the access point description provided subsequently herein.

At block 812, the enrollee device waits for a response. The enrollee device will start active and passive scans for any WPS-active APs that are enabled for its MAC address. At block 814, if no WPS-active networks are found by the enrollee device, then the enrollee device must assume that it is not accepted. Consequently, it will restart its discovery process (i.e., rescan for all SAW-capable networks). If a WPS-active network is found, then the enrollee device joins the network.

The aforementioned access point device of the present example includes two distinct entities: hostapd (Host Access Point Daemon), and CPD (Configuration Protocol Daemon, e.g.; AirPort Configuration Protocol Daemon).

Figure 9:
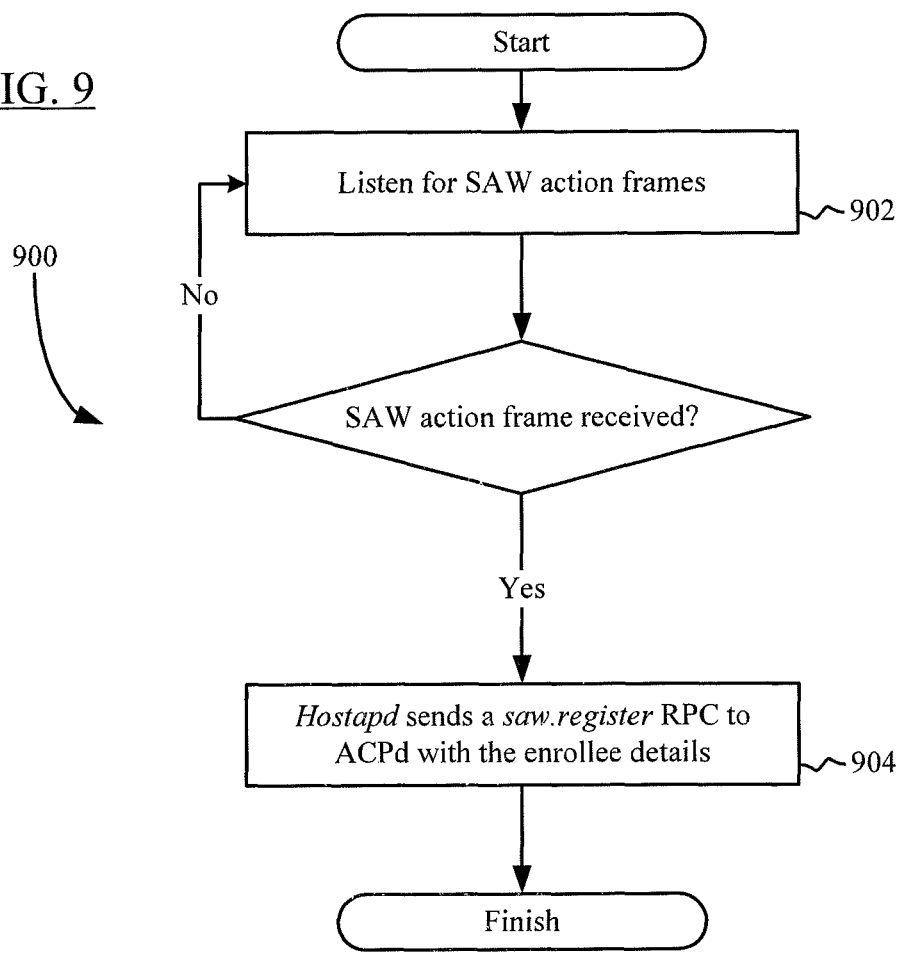
FIG. 9 illustrates one exemplary embodiment of a registrar/authorizer/access point process executed by an exemplary wireless network-attached storage device, according to some embodiments of the present invention.

FIG. 9 illustrates the operation of the access point hostapd process 900. The hostapd process constantly monitors for SAW action frames or probe requests 902. When an SAW action frame or probe request is received, the hostapd sends a registration request (e.g., saw.register) to the CPD with the enrollee details 904.

Figure 10:
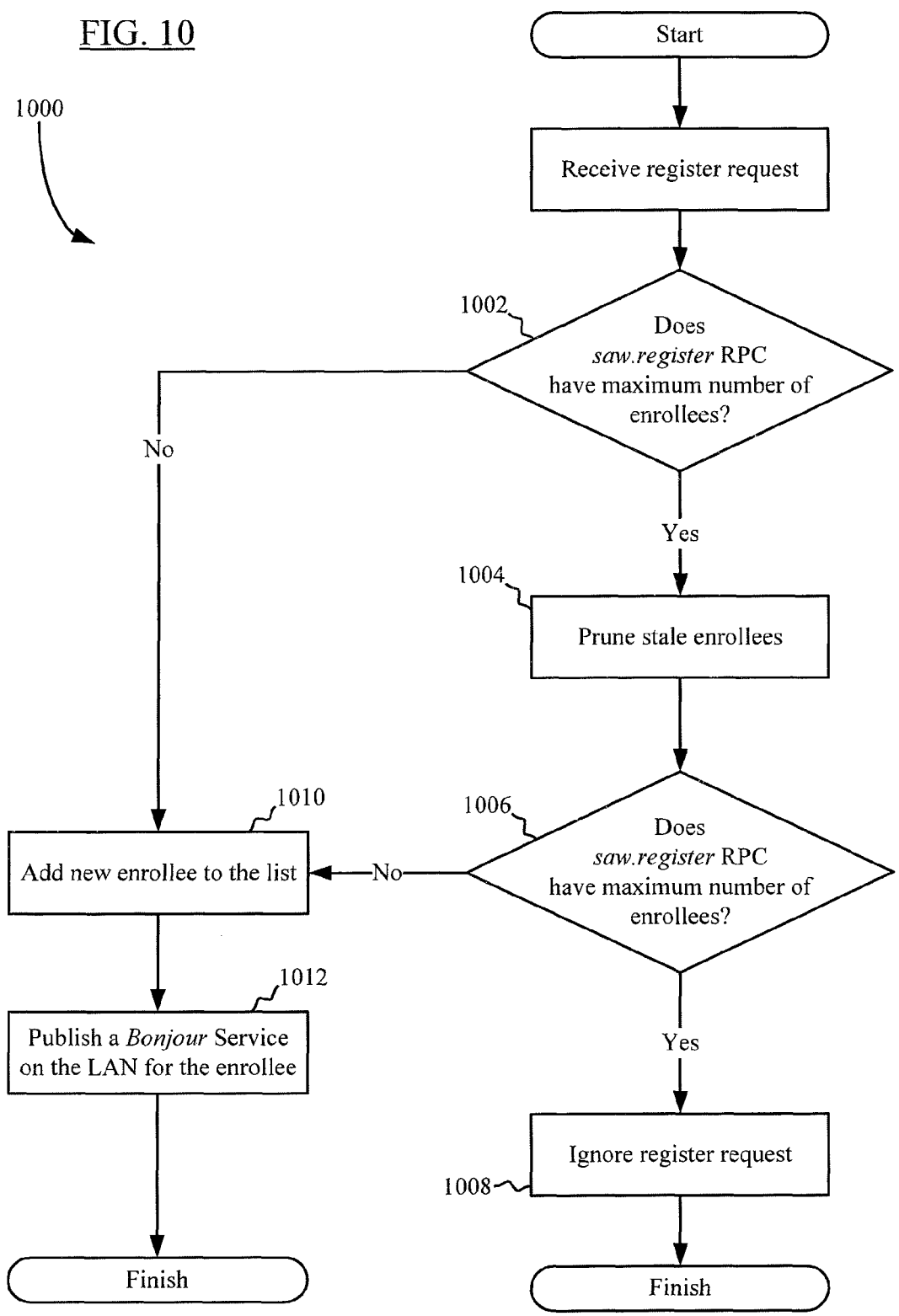
FIG. 10 illustrates one embodiment of the access point functionality of the process of FIG. 9 in greater detail.

FIG. 10 illustrates the access point's CPD process 1000. When the CPD process receives a registration request (e.g., saw.register), the access point determines if it may allow the new enrollee (i.e., the AirPort Express) onto the network. First, at block 1002, the CPD determines if it already has the maximum number of enrollees. If the CPD has extra enrollees, it attempts to prune stale enrollees at block 1004. If the CPD determines that the maximum number of enrollees has been reached at block 1006, then the registration request is ignored at block 1008. Otherwise, the CPD will add the new enrollee to the list at block 1010, and publish the enrollee on a service discovery listing of the LAN at block 1012. In some embodiments, the rejecting of an enrollee is logged internally or externally indicated. In embodiments where the expected frequency of enrollee rejection is likely, logging or indications may be suppressed. In one variant, no log or indication is given and logging space is reserved for more important messaging.

Figure 11:
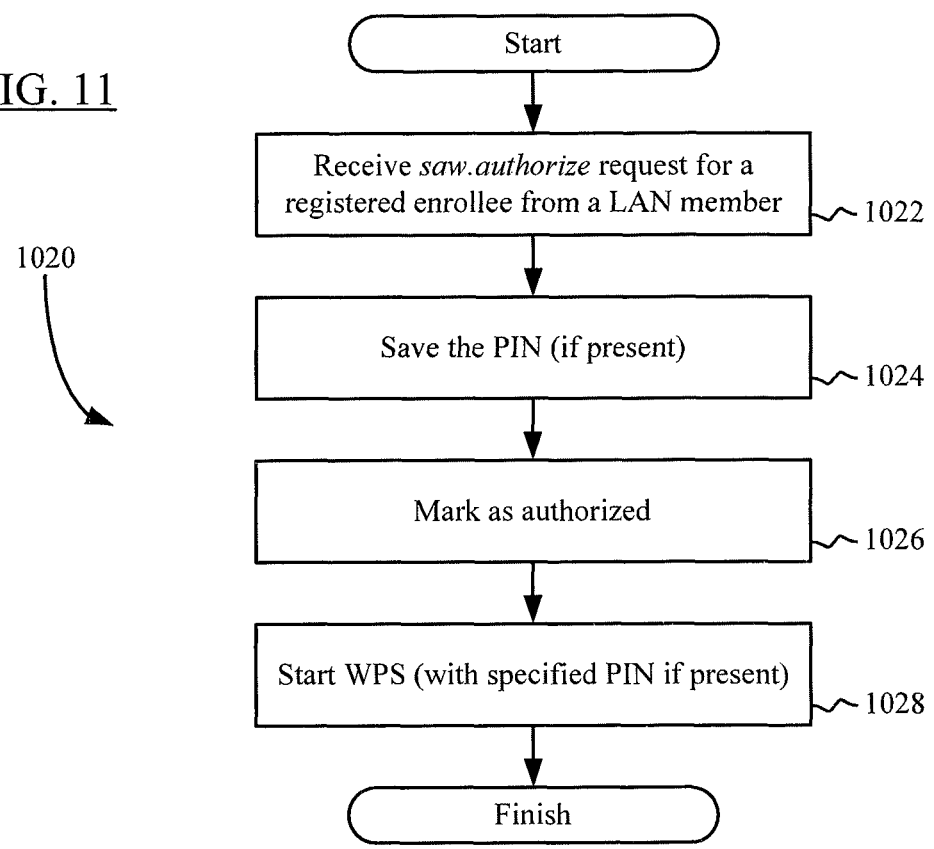
FIG. 11 illustrates one embodiment of the registrar and authorizer point functionality of the process of FIG. 9 in greater detail.

After the access point CPD has initiated the service discovery listing, it will wait for a response from the authorizing LAN member. The access point CPD will monitor for any valid authorization requests from existing LAN members (e.g., from the authorizer). Once the enrollee is authorized, the methodology of FIG. 11 is invoked. FIG. 11 illustrates one embodiment of starting of WPS processes 1020. At block 1022, a authorization request (e.g., saw.authorize) for the enrollee device is received from an authorizing LAN member. The access point saves the enrollee, the PIN (or other Access Method identification) and authorization, to its registry at blocks 1024 and 1026 respectively. After updating its internal registry, the access point initiates WPS procedures with the enrollee using the specified PIN at block 1028.

Figure 12:
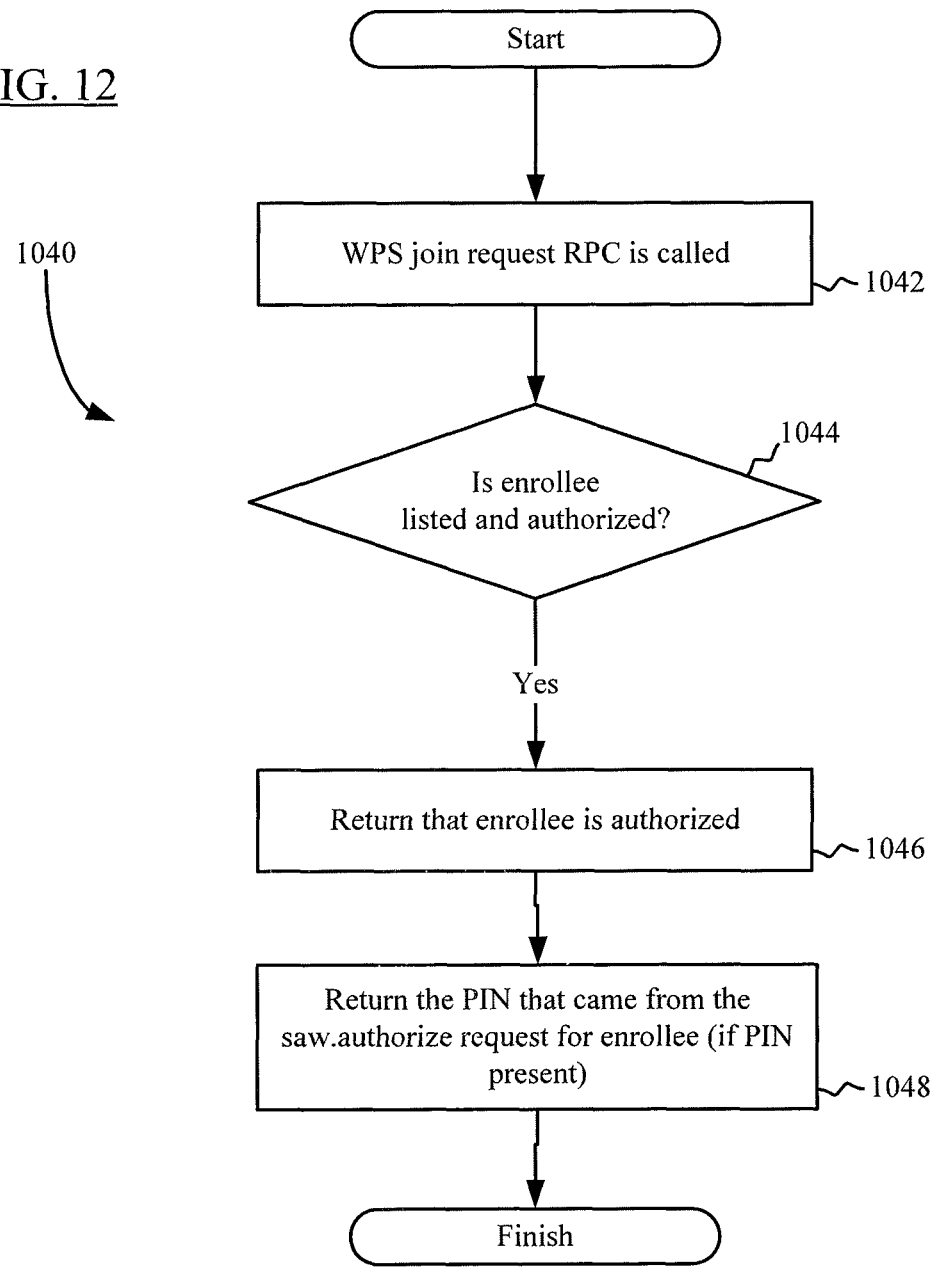
FIG. 12 illustrates one embodiment of the registration function of the process of FIG. 9 in greater detail.

In FIG. 12, the access point waits for the new member to attach to the network 1040. At block 1042, the access point receives a join request (e.g., WPS join request RPC). Once the access point receives the join request from the enrollee, it checks that the enrollee is in its internal registry, and is appropriately authorized per block 1044. For authorized enrollees, the access point returns that the enrollee is authorized at block 1046, and its corresponding PIN (block 1048) as read from the internal registry (i.e., the PIN is retrieved from the authorization request for this enrollee). If the enrollee is not listed or authorized, the access point rejects the enrollee.

Figure 13:
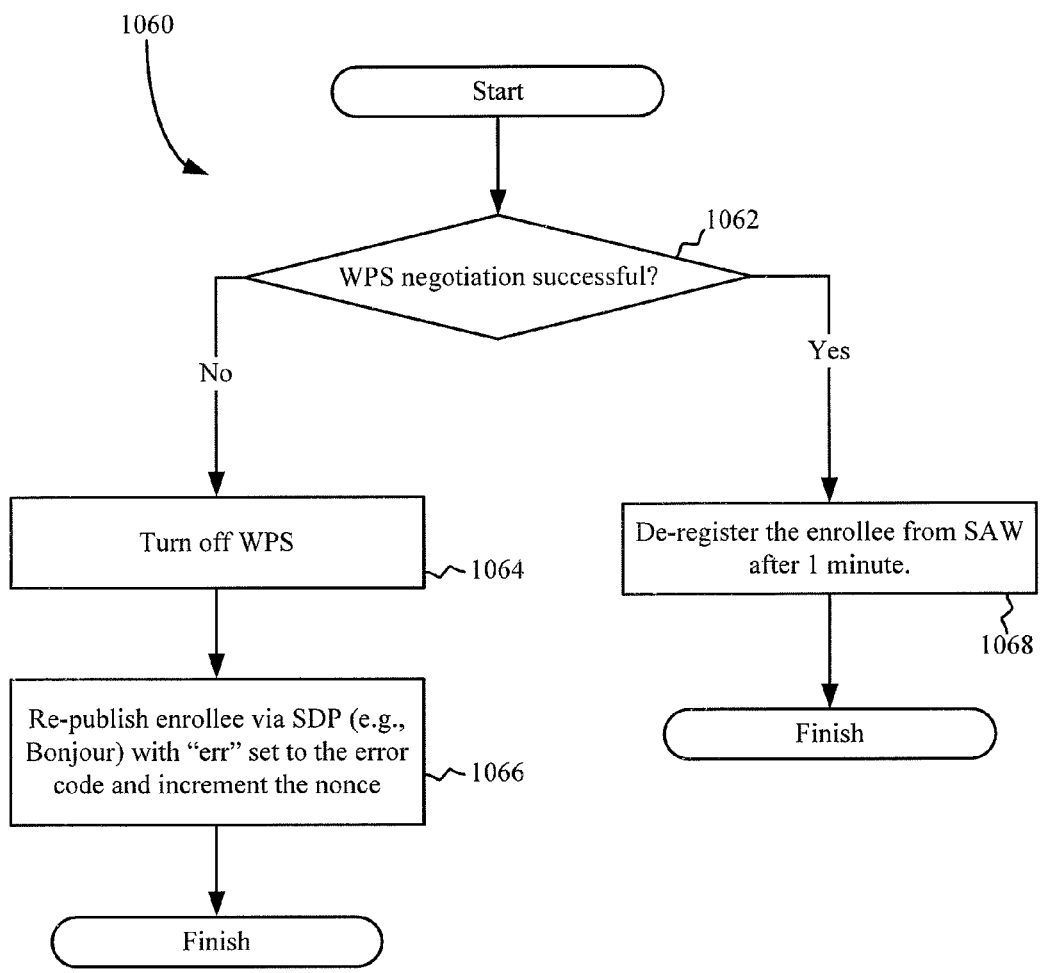
FIG. 13 illustrates one embodiment of the initiation of Wi-Fi Protected Setup (WPS) of the process of FIG. 9 in greater detail.

In FIG. 13, exemplary WPS negotiation processes 1060 are shown. If WPS negotiation succeeds (block 1062), the access point deregisters the enrollee from SAW after a prescribed time; e.g., one (1) minute (block 1068). If WPS negotiation fails, then WPS is aborted (block 1064), and the enrollee is republished via the service discovery protocol with an error code (block 1066). In one embodiment, a nonce element is changed to prevent "playback" attacks (i.e., network attacks where a valid data transmission is maliciously or fraudulently repeated).

In another example scenario, a user wants to add a printing device supporting Wi-Fi (e.g., wireless printer) to a Wireless Local Area Network. When the printing device is powered on, the device can search for nearby access points enabled for a particular security protocol. Upon detecting one or more access points enabled for the security protocol, the printing device can transmit action frames or probe requests to the detected access points. After receiving an action frame or probe request, an access point can notify, in any suitable manner, its network member devices of the presence of the printing device. After being notified of the printing device's presence, one or more member devices can determine whether the printing device is supported. In order to enroll the printing device onto the network, a user can run a configuration utility on a member device. The member device, in response, can display the printing device and indicate whether the printing device is supported. The user thereafter can select and configure the printing device (e.g., give it a recognizable name, and set printer-specific options such as toner level) via a graphical user interface or menu structure. After configuration, the user can select "Add Printer" or another control to indicate that the printing device should be added to the network. Thereafter, the printing device joins the network, and is ready to receive print jobs from any device (such as a PC or laptop) on the network, or at the behest of another device designated by the user as having such control. In certain embodiments, a software driver for the printing device may be automatically downloaded and configured if the printing device is supported.

Referring now to FIGS. 14-19, embodiments of the invention implementing the scenario above are described in detail. In these embodiments, the user, via an authorizer, adds a printing device (e.g., wireless printer) to a wireless network provided by an access point performing registrar functions (e.g., a Time Capsule™ device manufactured by Apple Inc., the Assignee hereof). The printing device can execute an enrollment process 1400 shown in FIG. 14. The access point can execute a process 1500 shown in FIG. 15, an initiation process 1700 shown in FIG. 17, a registration process 1800 shown in FIG. 18, and a process 1900 shown in FIG. 19. An authorizer (e.g., network member device) can execute an authorization process 1600 shown in FIG. 16.

Figure 14:
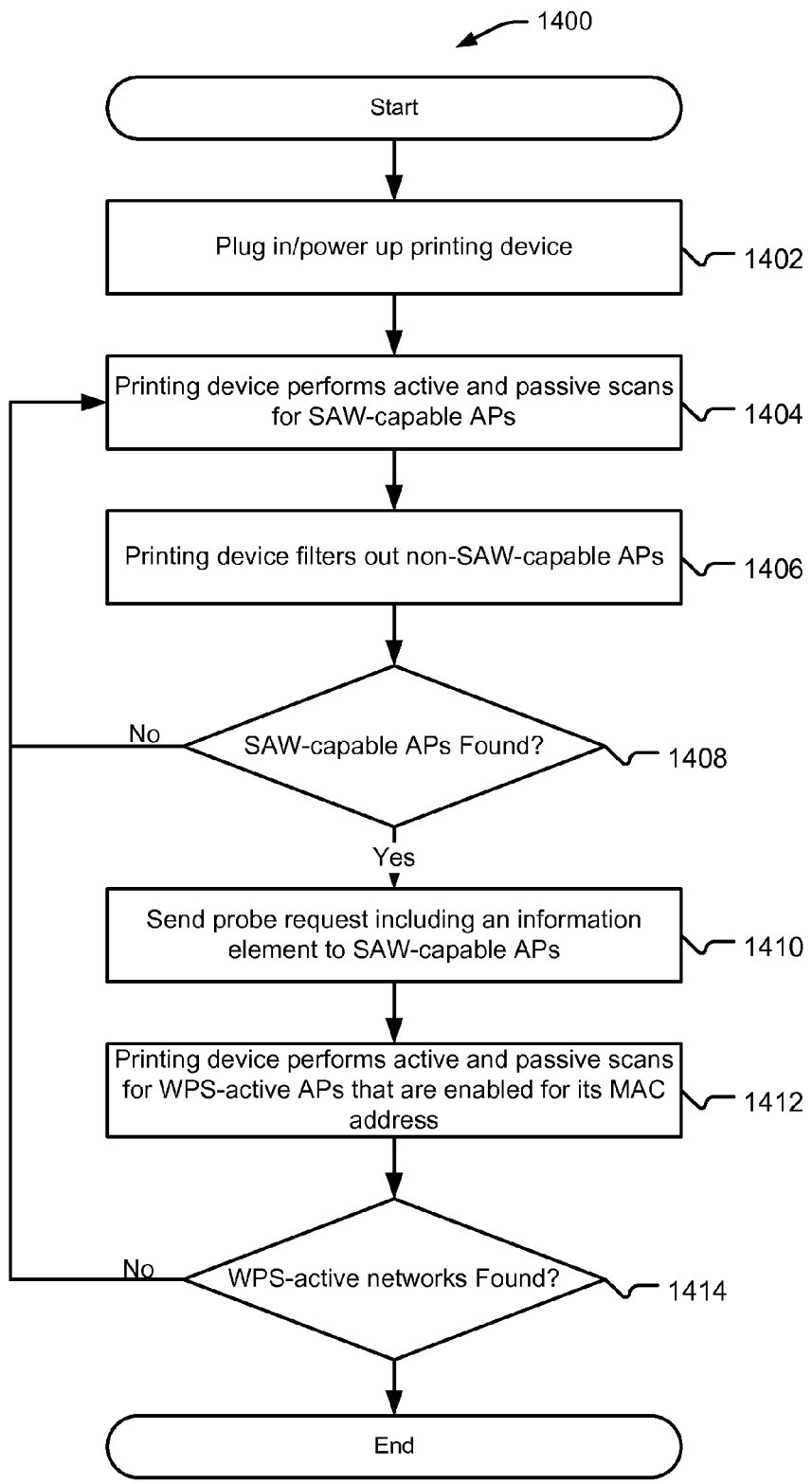
FIG. 14 illustrates an enrollment process executed by an exemplary printing device according to some embodiments of the present invention.

FIG. 14 shows an enrollment process 1400 that can be used by a printing device to advertise its presence to an access point according to embodiments of the invention. At block 1402, the printing device can be powered up or otherwise started. At block 1404, the printing device can scan for one or more wireless networks via a scanning operation. The scanning operation can be initiated automatically or manually. For example, the scanning operation can be initiated by manually pressing a button on the printing device or automatically if the printing device does not have network information already available when it starts up. In some embodiments, the scanning operation can include a series of active and/or passive scans for SAW-capable access points. The passive scans can be performed on a first channel subset and the active scans can be performed on a second channel subset. More specifically, during the passive scan, the printing device can passively scan a first frequency range subset corresponding to Dynamic Frequency Selection (DFS) "prohibited channels." Performing a passive scan can include attempting to blindly or to semi-blindly detect beacons for DFS networks. Beacons can include an access point service set identifier (SSID), active channel number(s), and one or more information elements (IEs) designating active security protocols. During an active scan, the printing device can transmit probe signals on a second frequency range subset corresponding to DFS "allowed channels." In response, available access points can transmit probe responses or association request/response messages. Both responses can include access point service set identifiers and one or more information elements (IEs) designating active security protocols. In some embodiments, the series of active and/or passive scans can be automatic, periodic, or triggered.

At block 1406, the printing device can identify one or more SAW-capable access points and filter out all non-SAW-capable access points. In some embodiments, the printing device can identify whether an access point is SAW-capable based on an information element received from the access point or on information stored locally at the printing device. For example, an information element received from an access point can include bits indicating whether the access point is SAW-capable.

At decision 1408, the printing device can determine whether one or more SAW-capable access points are found. If no SAW-capable access points are found, the printing device can continue the scanning operation. A scanning operation can occur periodically on any suitable semi-frequent basis. For example, a scanning operation can be performed every 2 minutes. If one or more SAW-capable access points are found, the printing device can send a request to one or more of the identified SAW-capable access points at block 1410. For example, the printing device can transmit an action frame or probe request to each identified SAW-capable access point. In certain embodiments, an action frame or probe request can include configuration information. The configuration information can be provided by an information element included in or accompanied with an action frame or probe request. The configuration information can include a set of security modes supported by the printing device, human-recognizable identifiers, software application-specific identifiers (e.g., device types, TXT records including record keys, etc.), in-band configuration data, printing device identifiers (e.g., MAC addresses, manufacturer/vendor information, model information) and/or the like. For example, a probe request can include, among other configuration information, printer description TXT record keys and printer protocol TXT record keys. The record keys can provide details about the printing device including the printing device's name, manufacturer/vendor, model, supported language standards, subtypes (i.e. printer), description, and/or the like.

In some embodiments, printer description TXT records keys can include pdl keys, product keys, usb_MFG keys, usb_MDL keys, ty keys, and/or the like. The pdl key can indicate whether a printing device supports PostScript. In some embodiments, the value of the pdl key can contain comma separated MIME types of page description languages supported by a given protocol or queue. The product key can include a manufacturer identifier (e.g., manufacturer/vendor name) and model identifier (e.g., model name) for the printing device. The usb_MFG key can include an identifier indicating the manufacturer of the printing device. The usb_MDL key can include an identifier indicating the model of the printing device. The ty key can include information that describes the printing device. The description of the printing device can be formatted and described in a manner suitable for display on a graphical user interface. For example, the value of the ty key can include a human readable description for the printing device, such as "Apple LaserWriter Pro 630™."

Responsive to a request, a SAW-capable access point can provide information to identify itself For instance, the identified SAW-capable access point can transmit an information element with a WPS-active flag, and a MAC address corresponding to the printing device.

At block 1412, the printing device can scan for responses to its requests. In some embodiments, the printing device can start active and passive scans for any WPS-active access points that are enabled for its MAC address (i.e. scan for information elements including the printing device's MAC address). At decision 1414, the printing device determines whether a network enabled for its MAC address is found. If a network enabled for its MAC address is not found, the printing device can assume that its request to join a network has not been accepted. As a result, the printing device can restart the discovery process (i.e., rescan for all SAW-capable access points). If an access point enabled for its MAC address is found, the printing device can join the network associated with the access point. In order to join the network, the printing device can again provide, among other information, its MAC address. By again providing its MAC address, other devices on the network (e.g., access point, authorizers, etc.) can recognize that the recently joined printing device is the same device that formerly requested to join the network.

Figure 15:
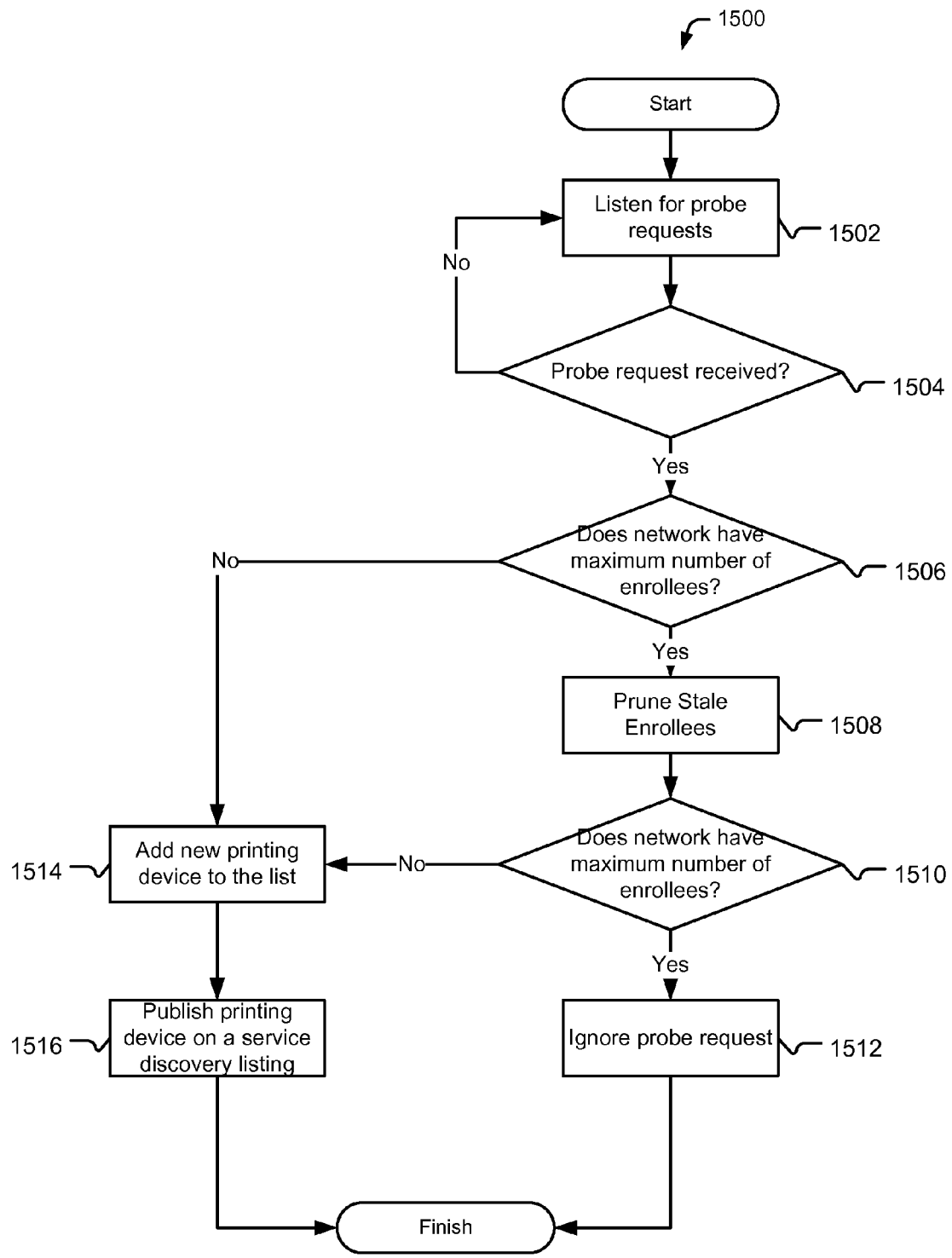
FIG. 15 illustrates a discovery and notification process executed by an exemplary access point according to some embodiments of the present invention

FIG. 15 illustrates the operation of a discovery and notification process 1500 that can be used by an access point to process requests received from a printing device and to publish information regarding the printing device to a network associated with the access point according to embodiments of the invention. In some embodiments, the process 1500 can be executed by a daemon. In certain embodiments, the daemon can be implemented, e.g., as one or more processes executed in a microprocessor or microcontroller within the access point, such as the host APD and CPD described above.

At block 1502, the access point can monitor or listen for action frames or probe requests. At decision 1504, the access point can determine whether an action frame or probe request has been received.

Upon receiving an action frame or probe request from the printing device, the access point can determine if a maximum number of enrollees are currently on a network associated with the access point (block 1506). If the access point determines the network includes a maximum number of enrollees, the access point can attempt to prune stale enrollees (e.g., enrollees that have not had recent network activity) at block 1508. At decision 1510, the access point can again determine, subsequent to pruning, if the number of enrollees on the network are currently at a maximum. If a maximum number of enrollees are on the network, the action frame or probe request can be ignored at block 1512. In some embodiments, ignoring of the action frame or probe request can be logged internally and/or indicated externally. In embodiments where the expected frequency of enrollee rejection is high, logging or indications can be suppressed. In one embodiment, no log or indication is given and logging space can be reserved for other information.

If the maximum number of enrollees has not been reached on the network, the access point can add the printing device to a list of enrollees at block 1514. At block 1516, the access point can publish information regarding the printing device on a service discovery listing for the network. More specifically, the access point can publish a TXT record representing the printing device on the network. In some embodiments, the TXT record can include the printer description and protocol TXT record keys initially received from the printing device. In other embodiments, the TXT record can include information based on the printer description and protocol TXT record keys initially received from the printing device.

Figure 16:
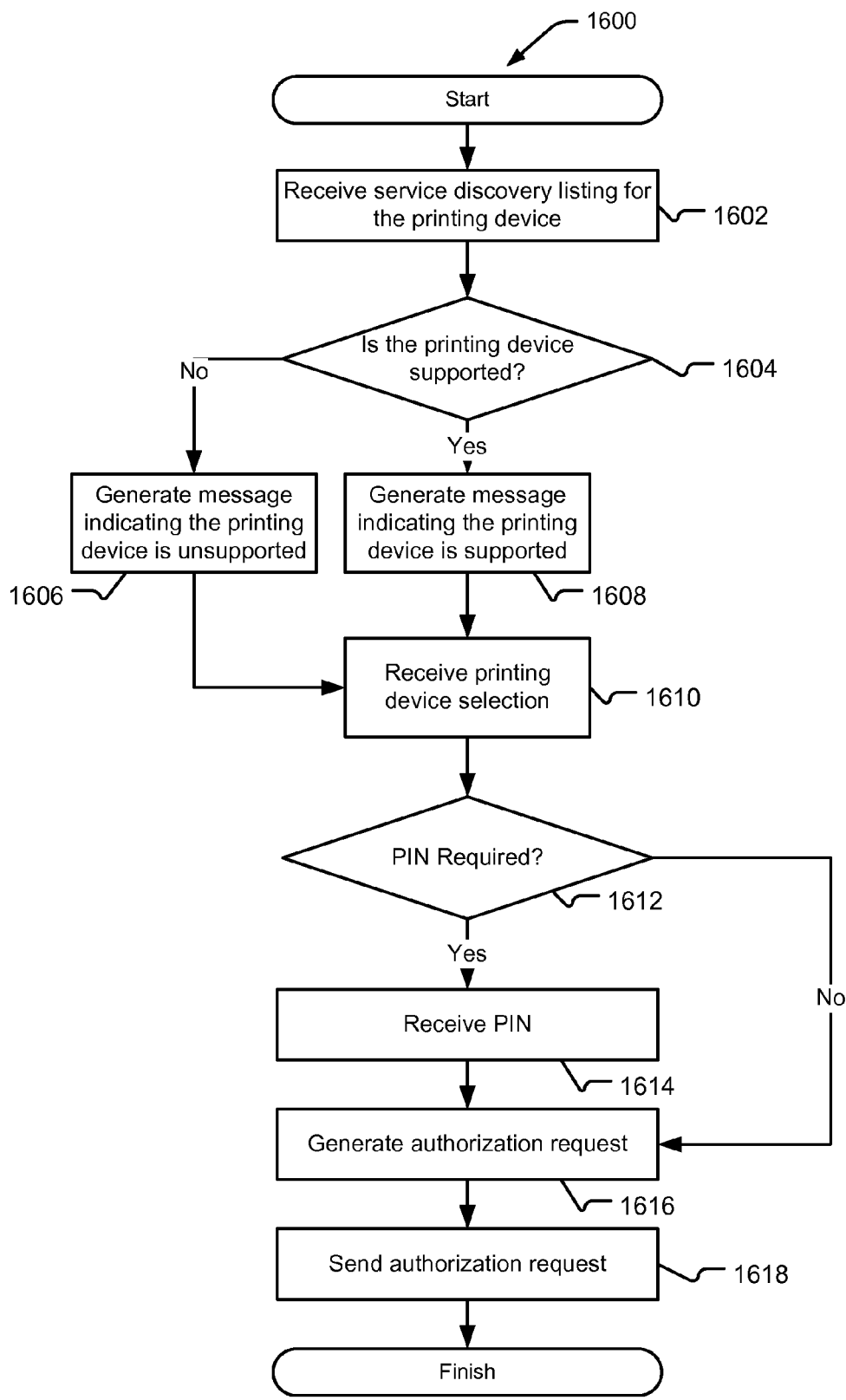
FIG. 16 illustrates an authorization process executed by an exemplary authorizer, according to some embodiments of the present invention.

FIG. 16 illustrates an authorization process 1600 that can be used by an authorizer to indicate that a printing device can join a network. At block 1602, an authorizer, such as a network member device, can receive a service discovery listing for the printing device from an access point. The network member device can be a desktop computer, a laptop computer, a tablet device, a cellular phone, a smartphone, a multimedia device (e.g., a device for video and/or audio playback and/or recording), a portable computing device, a multi-function device, and/or the like. In some embodiments, the authorizer or another network member device can have previously indicated to the access point to publish or send a service discovery listing when the presence of a device requesting enrollment onto the network is detected. In other embodiments, the authorizer can periodically poll the access point to obtain service discovery listings for any devices requesting enrollment onto the network.

At decision 1604, the authorizer can determine if the printing device is supported. In certain embodiments, a printing device can be determined to be supported if a software driver is available for the device or if the device can be driven by a standard printing language (e.g., PostScript).

In some embodiments, the authorizer can determine whether a printing device is supported based on the service discovery listing for the printing device received. In certain embodiments, the authorizer can use the manufacturer and model information provided by the product, usb_MFG, and/or usb_MDL keys (printer description TXT record keys) included in the service discovery listing to determine whether a printing device is supported. For example, the authorizer can determine, using the keys, whether a software driver can be obtained and configured for the printing device. A software driver can be a computer program that can facilitate communication between a device and other computer programs. In order to determine whether a software driver can be obtained, the authorizer can access one or more software driver databases (e.g., software driver catalogs) and cause one or more searches to be performed among the records stored in the software driver databases. In certain embodiments, a software driver database can be stored locally on the authorizer. The software driver database can be updated periodically, for example, via an automatic software update process. In some embodiments, a software driver database is not stored locally on the authorizer, but can be accessed over a local network or the Internet.

A search of the software driver databases can be based on the manufacturer and/or model information provided by the printer description TXT record keys. For example, a search can be performed for a LaserWriter 12/640 PS™ based on the value of a product key.

In some embodiments, if a record matching the manufacturer and/or model information is located or if a record indicates that a software driver for the printing device is available, the authorizer can determine that the printing device is supported. In certain embodiments, the record can additionally indicate the manner in which a software driver for the printing device can be obtained. For example, the record can indicate that a software driver for the printing device is located on a particular server computer accessible via the Internet. In some embodiments, upon determining that a printing device is supported, the authorizer can automatically obtain and/or configure the software driver for the printing device prior to the printing device joining the network. For example, the authorizer can automatically begin downloading a software driver package from a server computer over the Internet after support is determined. In other embodiments, the authorizer can automatically obtain and/or configure a software driver for the printing device after the printing device joins the network.

In certain embodiments, a software driver database record can indicate that the printing device supports one or more printing standards. For example, a record can indicate that a printing device supports universal printing. As such, a separate software driver for the printing device may not need to be obtained and/or configured.

It should be appreciated that determining printing device support through searching a database is merely exemplary. Determination of device support can be accomplished in any suitable manner. For example, support can be determined by performing a search in a simple list, parsing an XML file, etc.

In some embodiments, the authorizer can use the pdl key included in the service discovery listing to determine if the printing device supports PostScript. If the pdl key value indicates support for PostScript, the authorizer can determine that the printing device is supported.

In some embodiments, the authorizer can determine if a printing device is supported by first attempting to identify if a software driver is available for the printing device based on the printing device's manufacturer and/or model. If a software driver is not available for the printing device, the authorizer can then determine whether the printing device supports a standard printing language (e.g., PostScript).

If the authorizer determines that the printing device is not supported (e.g., a software driver for the printing device can not be located for the printing device and PostScript is not supported), the authorizer can generate a message to the user (e.g., via a graphical user interface) indicating that the printing device is unsupported (block 1606). For example, a graphical user interface can indicate that the printing device is unsupported by graying out an identifier for the printing device, labeling the printing device as unsupported, and/or the like. In some embodiments, the identifier for the printing device can include the printing device's manufacturer, model, and/or description information. In some embodiments, a message is not generated or presented to the user until the user requests to initiate a print operation or set up the printing device via a configuration utility.

If the authorizer determines that the printing device is supported, the authorizer can generate a message to the user (e.g., via a graphical user interface) indicating support for the printing device (block 1608). For example, a graphical user interface can indicate to a user that the printing device is supported by allowing an identifier for the device to be selected, labeling the printing device as being supported, and/or the like. In some embodiments, the identifier for the printing device can include the printing device's manufacturer, model, and/or description information. In some embodiments, a message is not generated or presented to the user until the user requests to initiate a print operation or setup the printing device via a configuration utility.

In some embodiments, the authorizer can receive an indication from a user that the printing device is to be enrolled onto the network (block 1610). For example, a user may interact with the graphical user interface and select the printing device from a list of available printing devices. In certain embodiments, if the authorizer previously determined that the printing device is not supported, the authorizer can notify the user that the printing device may not be operational upon enrollment onto the network.

After receiving an indication that the user wishes to enroll the printing device onto the network, the authorizer can determine if a PIN is required for the printing device (decision 1612). If a PIN is required, the authorizer can prompt the user to enter the PIN. For example, the authorizer can generate a graphical user interface including one or more text fields. The user can interact with the graphical user interface to enter a PIN for the printing device. At block 1614, the PIN is received by the authorizer. At block 1616, the authorizer can generate an authorization request (e.g., saw. authorize). The authorization request can contain information indicating that the printing device is to be permitted to join the wireless network. After generating the authorization request, the authorizer can send the authorization request to the access point (block 1618).

Figure 17:
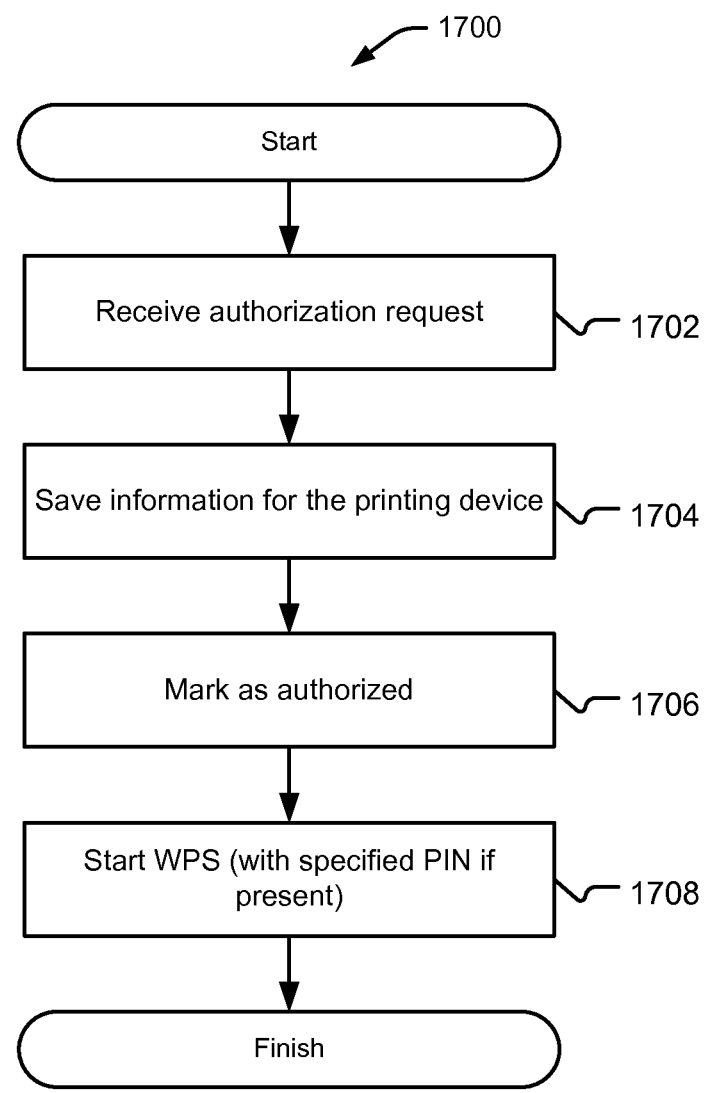
FIG. 17 illustrates an initiation process executed by an exemplary access point, according to some embodiments of the present invention.

FIG. 17 illustrates an activation process 1700 that can performed by an access point to activate a printing device for a network associated with the access point. At block 1702, the access point can receive an authorization request (e.g., saw-.authorize) from the authorizer (e.g., network member). The access point subsequently can save information for the printing device (e.g., MAC address for the printing device, model, manufacturer), the PIN (or other Access Method identification), and authorization, to its registry at block 1704. The access point additionally can mark the printing device as authorized at block 1706. After updating its internal registry, the access point can initiate WPS procedures with the printing device using the specified PIN at block 1708. In particular, the access point may transmit an information element to the printing device. The information element can indicate that the access point has enabled WPS. The information element can additionally include the MAC address of the printing device, thus explicitly identifying the printing device.

Figure 18:
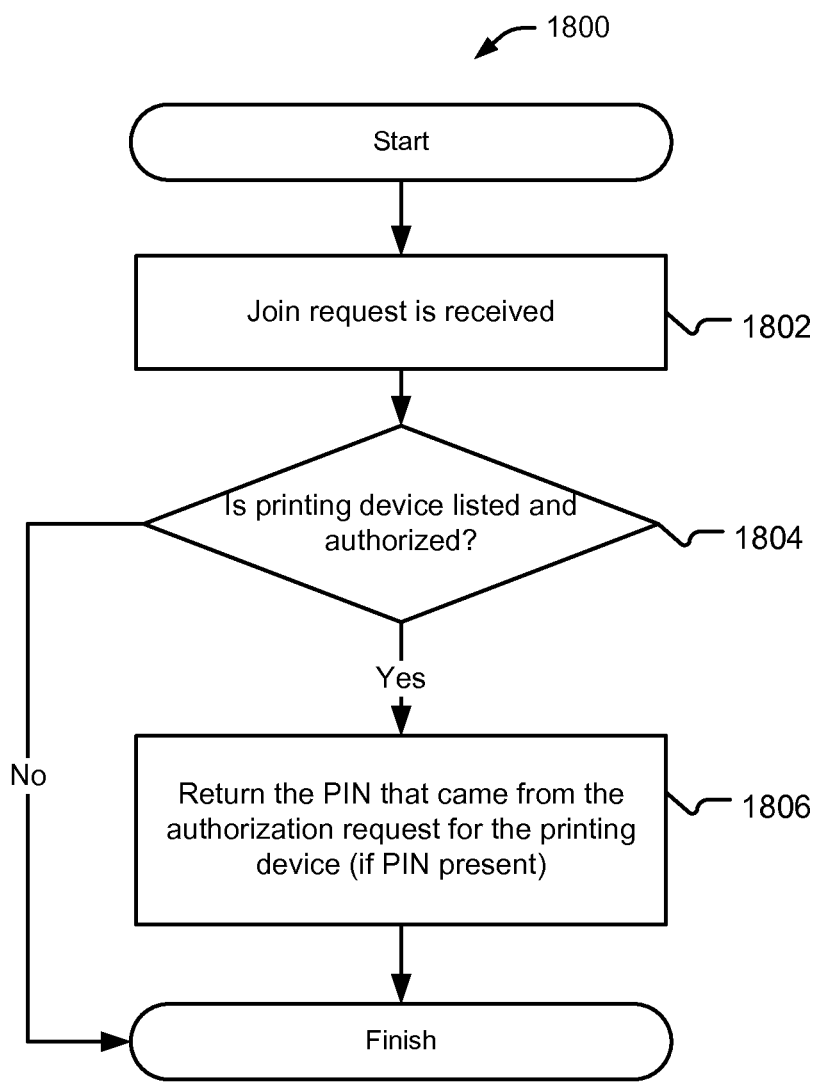
FIG. 18 illustrates a registration process executed by an exemplary access point according to some embodiments of the present invention.

FIG. 18 illustrates a registration process 1800 that can performed by an access point to register a printing device to a network associated with the access point. In FIG. 18, the access point can initially be waiting for the printing device to attach to the network. At block 1802, the access point can receive a join request (e.g., WPS join request RPC) from the printing device. Once the access point receives the join request from the printing device, the access point can check that the printing device is in its internal registry and is appropriately authorized at decision 1804. In some embodiments, the access point can determine whether the printing device is in its internal registry by checking whether the MAC address included in the join request matches a record stored in the internal registry. If the printing device is authorized, the access point can determine the printing device is authorized. In some embodiments, the access point can return a message to the printing device to confirm that the printing device is authorized. The access point can further determine the corresponding PIN (block 1806) for the printing device by reading the PIN from the internal registry (e.g., the PIN can be retrieved from the authorization request for the printing device). If the printing device is not listed or authorized, the access point can reject the printing device.

Figure 19:
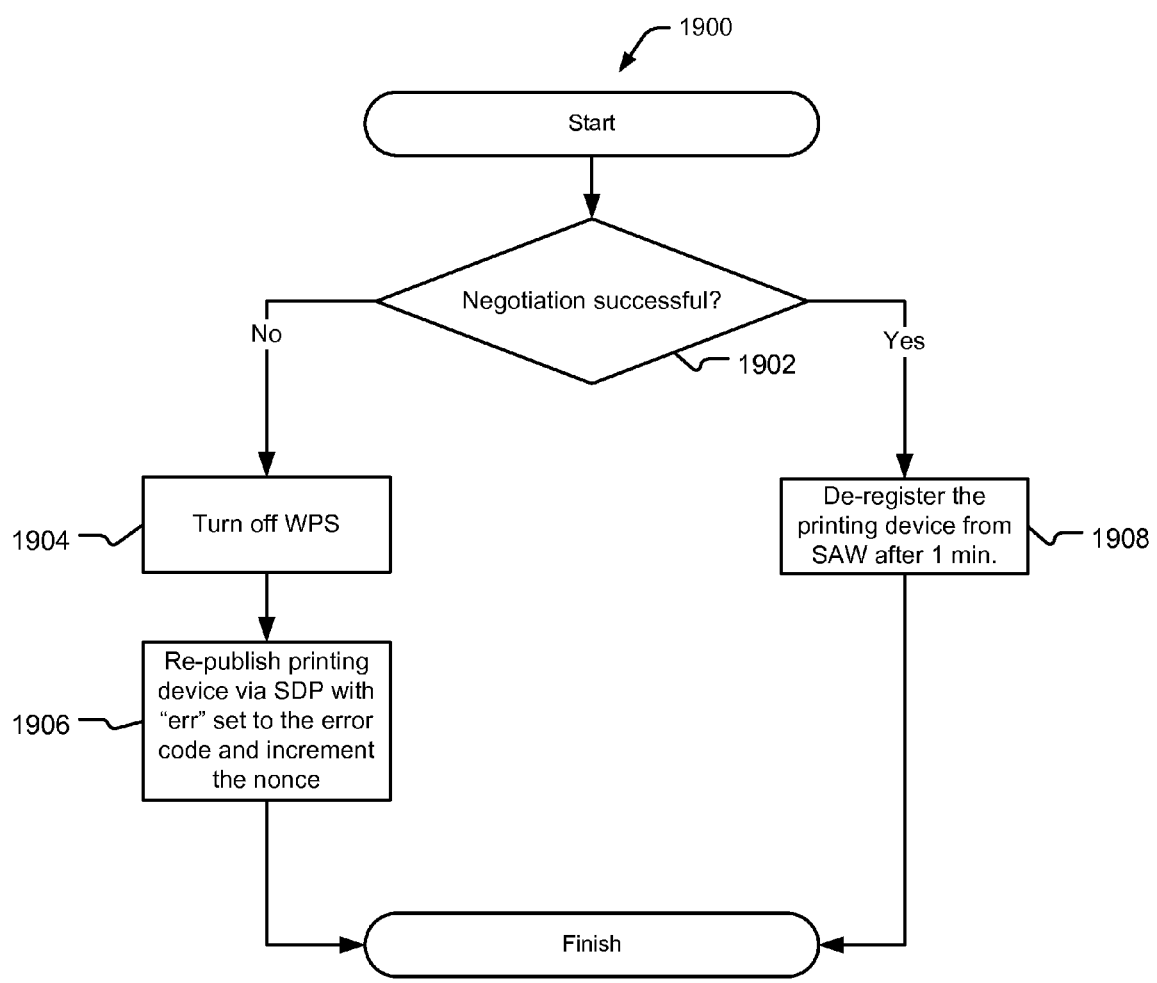
FIG. 19 illustrates a negotiation process executed by an exemplary access point, according to some embodiments of the present invention.

FIG. 19 illustrates a process 1900 that can used by an access point to determine whether enrollment of a printing device to a network is successful, and to perform post negotiation processing accordingly. At decision 1902, the access point can determine whether the printing device has successfully joined the network via WPS access negotiation. If the printing device has not successfully joined the network via WPS access negotiation, WPS can be turned off (block 1904). At block 1906, the printing device can be republished via a service discovery protocol with an error code. In one embodiment, a nonce element can be changed to prevent "playback" attacks (i.e., network attacks where a valid data transmission is maliciously or fraudulently repeated). If the printing device has successfully joined the network via WPS access negotiation, the access point can deregister the printing device from SAW after a prescribed time; e.g., one (1) minute (block 1908). The printing device can be deregistered from SAW because the device has joined the network and no longer needs to be "setup."

It should be appreciated that while the foregoing scenario is directed to printing devices, it can also be directed to the enrollment of any number of other devices onto a network. For example, in any instance where a computing system (e.g., desktop, laptop, mobile computing device, PDA) requires a suitable driver program to interact with a wireless peripheral device (e.g., printer, scanner, storage media reader/recorder), techniques similar to those described above can be used to confirm whether a driver is available prior to authorizing the peripheral device to join a network.

The users in the foregoing scenarios do not have to perform all of the actions commonly associated with adding wireless networking devices (e.g.; wireless network switching or reconfiguration, providing passwords, inputting network addresses, etc.), In some embodiments, the user need only confirm, e.g., by responding to a prompt from the authorizer, that the enrollee device should join the network; thus, the user's involvement can be as simple as powering up the enrollee device and clicking "Yes" or entering a PIN when prompted by the authorizer. Thus, from the user's perspective, the task of adding a device to a wireless network can be considerably simplified.

Fully Automated Enrollment

In another embodiment of the invention, enrollment of a wireless device can even be completed completely automatically when appropriate permissions are granted. For example, an enrollee or client device can be configured from the manufacturer or the point of sale (or via other means) to include user-specific information, such as by programming via an RFID or near-field communication (NFC) device programmer or interrogator of the type well known in the RF arts (akin to the programming of portable RFID devices such as the prior art "Mobil Speedpass" for use at gas stations). Programmed user specific data (e.g., user name, PIN, device name, etc.) can be input at time of purchase (e.g., via an online website, at a point of sale device, etc.), or even drawn from an existing credit card, smart card, or other device. This information can be stored in a non-volatile storage device of the enrollee device, to be accessed at time of enrollment (e.g., when the user places the device within their network). When plugged in or turned on for example, the programmed enrollee device would initiate the exemplary protocol 200 of FIG. 2 described above (e.g., active/passive scans), and based on detection of an AP 106 or other network device, begin the negotiation process. However, unlike the foregoing methods, the pre-granted "permissions" programmed into the AP and/or enrollee device will allow an enrollee device displaying proper credentials (e.g., user name=X, PIN=Y, and security protocol supported=Z, etc.) to associate with the network automatically, and with no user intervention. This approach advantageously provides a completely seamless user experience.

Apparatus

Referring now to FIG. 20, one embodiment of an exemplary apparatus (e.g., client 104) useful in implementing the methods of embodiments of present invention is described. The exemplary wireless apparatus includes a radio modem subsystem 2002, a processing subsystem 2004, a memory subsystem 2006, and a power subsystem 2008 mounted on one or more substrates 2010.

The radio modem subsystem 2002 includes a radio 2002A, and a modem 2002B. The radio modem subsystem 2002 provides data transmission and reception capabilities for the wireless device 104. While the foregoing discussion refers to an IEEE 802.11 compliant radio modem subsystem, it is readily appreciated that other wireless and wired embodiments may be used consistent with embodiments of the present invention.

The processing subsystem 2004 of the device 104 may include a digital signal processor, microprocessor, field-programmable gate array, or plurality of processing components. The processing subsystem enables execution of a software application, comprising a set of computer readable instructions. The processing subsystem is operatively coupled to a memory subsystem 2006. While the exemplary apparatus utilizes software (i.e., any sequence or human or machine cognizable actions which perform a function, such as a computer program); it is appreciated that in other embodiments, the techniques described previously herein may be performed in firmware, or alternately, codified directly in hardware (e.g., logical gates, sequential memories, etc.).

The memory subsystem 2006 includes for example RAM, ROM, Flash, and/or disk drive components. The memory subsystem 2006 may implement one or a more of Direct Memory Access (DMA) type hardware, so as to facilitate data accesses, as is well known in the processor arts. The memory subsystem stores the aforementioned computer readable instructions. The memory subsystem may also retain transitive data or instructions useful for intermediate processing operations of the processing subsystem 2004 (e.g., a software stack, etc.). As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, FLASH memory (e.g., NAND/NOR), and PSRAM.

The illustrated power management subsystem (PMS) 2008 provides power to the apparatus, and may include an integrated circuit (IC) and/or a plurality of discrete electrical components. In an exemplary portable client apparatus 104, the power management subsystem interfaces with a battery (which may be supplemented with a recharging capability, solar cells, or other power generating apparatus not shown). In alternate non-portable apparatus (e.g., a fixed AP or the like), or semi-portable apparatus, the power management subsystem may receive external power (e.g., using a wall outlet, car adapter, etc.), and provide power conditioning capabilities (e.g., surge protection, blackout or UPS functionality, etc.)

In one embodiment of the wireless apparatus 104, the power management subsystem 2008 supplies power to the processing subsystem 2004 and memory subsystems 2006. The processing subsystem 2004 actively interfaces the memory subsystem 2006 to perform a plurality of initialization processes (e.g., booting, etc.). Once the processing subsystem 2004 has completed internal initialization, the processing subsystem initializes peripheral subsystems; e.g., the radio modem subsystem 2006. The wireless apparatus then executes the software application which performs one or more blocks of the previously described solicited activation procedure 200 (FIG. 2, et seq.).

As described previously, the solicited activation procedure employs the participation of three (3) or more distinct functional elements: the enrollee, the authorizer, and the registrar. Optionally, an authenticator may be additionally required. The following discussions summarize the portions of the foregoing procedures, when executed within the wireless apparatus of FIG. 20.

In one exemplary embodiment, the wireless device may execute a software application adapted to perform the enrollee function. Accordingly, the enrollee performs one or more functions selected from: scanning for SAW-capable networks 202, identification of SAW-capable networks 204, requesting of access 206, and the client blocks of the optional authentication procedure 208A (e.g., WPS).

It is further noted that the apparatus of FIG. 20 may take on any number of configurations. For example, common enrollee devices range from handheld PDAs, smartphones, and computers, to network appliances such as printers, copiers, and media servers. Accordingly, many enrollee devices additionally include multiple other application specific subsystems, including user interfaces, more extensive memory subsystems, specialized apparatus (e.g., printing apparatus), audio visual components, etc.

The enrollee apparatus is adapted to scan for one or more wireless networks via active probes, passive scans or a combination thereof. In some embodiments, the radio modem 2002 may actively transmit access probes. The radio modem 2002 may also be configured to tune in to one or more physical resources, such as time, frequency, code, or a combination thereof. In yet other embodiments, the radio modem 2002 may actively transmit probes on a selected first subset of resources, and passively scan a second set of resources. Accordingly, the radio modem subsystem 2002 can selectively modify its operation. For example, in common Wi-Fi transceivers, a first set of resources are indicated as available for active probing, and a second set of resources is indicated as prohibited for probing. Within Wi-Fi, one or more parameters for Dynamic Frequency Selection (DFS) identify the channels which are prohibited from active probing.

Other exemplary embodiments of the wireless apparatus may execute software adapted to perform one or more authorizer functions (see e.g., block 208 of FIG. 2). During execution of the authorizing software application, the wireless apparatus determines from user input, whether or not to authorize an enrollee. Accordingly, the wireless apparatus may additionally comprise a user interface to facilitate this functionality. Such user interfaces may include without limitation: a keypad, touch screen, LCD display, backlight, speaker, and/or microphone (optionally with speech recognition capability). In one illustrative example, a smartphone (e.g., iPhone) may display a user dialog via a display unit thereon, and provide a touch screen input "button" for the user's response.

In another exemplary embodiment, the wireless apparatus software application is adapted to perform one or more registrar functions. In one such embodiment, a registrar maintains a centralized database of the devices which are currently registered and addressed within the protected wireless network. Such a wireless apparatus may additionally require one or more memory apparatus and interfaces for database operations. Furthermore, such a wireless apparatus may additionally comprise a secondary interface (wired or wireless), which connects to a comprehensive external database. For example, large scale networks (e.g., cellular, cable, etc.) commonly implement localized and remote databases.

The wireless device may additionally comprise one or more subsections specifically adapted for authentication (see FIG. 2, block 208A). In one embodiment, such authentication may be carried out in software. Alternately, in other embodiments, a dedicated hardware authentication engine or other security apparatus (e.g., security processor) may be used.

While the foregoing apparatus architectures are discussed with respect to the illustrated embodiment of FIG. 20, in some embodiments various portions may be obviated or otherwise merged with another component (e.g., multi-mode or single-chip solutions), as would be readily appreciated by one of ordinary skill in the art given the present disclosure.

Methods of doing Business

In another embodiment of the invention, exemplary methods of doing business relating to the foregoing wireless network management capabilities are disclosed.

In one embodiment, the wireless network management capabilities enabled by embodiments of the present invention can be marketed and leveraged. For example, a device manufacturer or service provider can differentiate their product or service over others based on the ease of use, flexibility of connectivity, and general robustness. In certain applications, (such as home networking), the flexibility of the system to dynamically add and subtract network elements of varying qualities and characteristics can also be used as a basis of differentiation or to support a higher product or service price. By giving consumers the ability to control their wireless LAN without having to necessarily understand the security and networking concepts, the customer will ostensibly be willing to pay more either in terms of initial price or subscription fees. Such devices are tangibly better from the consumer or end-user's perspective, since they merely need to power on the device; management may be simply performed on any device already connected on the LAN. The system of embodiments of the present invention is presented to the user in one simple and coherent interface.

In one example, a home user may easily set up or reconfigure a home office (e.g., speakers, printers, etc.), simply by adding more elements as he or she sees fit. Furthermore, the overall user experience is qualitatively better, as the new technology transparently "works" out of the box, as opposed to requiring extensive and potentially difficult reconfiguration, and/or consultation with online or service call experts. For example, the home user buys a speaker, and plugs it in. The user sees a notification immediately displayed on their laptop. The user clicks on the notification, and music begins playing.

In another example, the home user is listening to music on his personal media device (e.g., iPod Touch). He walks into his house; whereupon a discreet icon appears on his device. He taps the icon with his finger, and his music is played via a Wi-Fi enabled audio device (e.g., enrollee device) in the living room streamed from his media device.

It will be recognized that while certain embodiments of the invention are described in terms of a specific sequence of blocks of a method, these descriptions are only illustrative of the broader methods of embodiments of the present invention, and may be modified as required by the particular application. Certain blocks may be rendered unnecessary or optional under certain circumstances. Additionally, certain blocks or functionality may be added to the disclosed embodiments, or the order of performance of two or more blocks permuted. All such variations are considered to be encompassed within embodiments of the present invention disclosed and claimed herein.

While the above detailed description has shown, described, and pointed out features of specific embodiments of the present invention, it will be understood that various omissions, substitutions, and changes in the form and details of the device or process illustrated may be made by those skilled in the art without departing from the scope of the invention. This description is in no way meant to be limiting, but rather should be taken as illustrative of general principles of embodiments of the invention. The scope of the invention should be determined with reference to the claims.

What is claimed is:

1. A method for enrolling a printing device onto a wireless network, the method comprising:
   receiving, at a computer system, a service discovery record that was published, by an access point onto the wireless network, regarding a printing device that has requested enrollment onto a wireless network managed by the access point, wherein the record was initially supplied by the printing device to the access point and wherein the record comprises instructions on how to obtain a software driver for the printing device;
   using information contained in the record, by the computer system, to determine whether the printing device is supported based on the information regarding the printing device;
   asking the access point, by the computer system, to enroll the printing device onto the wireless network, thereby enabling the access point to enroll the printer onto the wireless network; and
   establishing, by the computer system, operation with the printing device via the wireless network by following the instructions to obtain the software driver for the printing device.

2. The method of claim 1, wherein the standard of printing language is PostScript.

3. The method of claim 1, wherein determining whether the printing device is supported comprises determining whether a software driver is available for the printing device.

4. The method of claim 1, wherein determining whether the printing device is supported comprises determining whether the printing device supports a standard printing language.

5. The method of claim 1, further comprising generating a message to a user, the message indicating whether the printing device is supported.

6. The method of claim 1, wherein establishing operation with the printing device comprises automatically configuring a software driver for the printing device.

7. An apparatus for use in a wireless network, the apparatus comprising:
   a processor capable of executing one or more computer executable instructions; and a memory storing a computer program executable by the processor, wherein the computer program, when executed by the processor, causes the processor to:

receive a service discovery record that was published, by an access point onto the wireless network, regarding a printing device that has requested enrollment onto a wireless network managed by the access point, wherein the record was initially supplied by the printing device to the access point and wherein the record comprises instructions on how to obtain a software driver for the printing device;

using information contained in the record to determine whether the printing device is supported based on the information regarding the printing device;

ask the access point, to enroll the printing device onto the wireless network, thereby enabling the access point to enroll the printer onto the wireless network; and establish operation with the printing device via the wireless network by following the instructions to obtain the software driver for the printing device.

8. The apparatus of claim 7, wherein determination of whether the printing device is supported comprises determining whether a software driver is available for the printing device.

9. The apparatus of claim 7, wherein determination of whether the printing device is supported comprises determining whether the printing device supports a standard printing language.

10. The apparatus of claim 7, wherein the computer program, when executed, further causes the processor to generate a graphical user interface, the graphical user interface indicating whether the printing device is supported.

11. The apparatus of claim 7, wherein the computer program, when executed, further causes the processor to receive a personal identification number for the printing device.

12. The apparatus of claim 7, wherein establishment of operation with the printing device comprises automatically retrieving a software driver for the printing device.

* * * * *